US012613623B2

(12) United States Patent
Zhang et al.

(10) Patent No.: US 12,613,623 B2
(45) Date of Patent: Apr. 28, 2026

(54) DISPLAY METHOD, ELECTRONIC DEVICE, AND STORAGE MEDIUM

(71) Applicant: Huawei Technologies Co., Ltd., Shenzhen (CN)

(72) Inventors: Ziyue Zhang, Shenzhen (CN); Ning Zhuang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 18/690,151

(22) PCT Filed: Aug. 17, 2022

(86) PCT No.: PCT/CN2022/113062
§ 371 (c)(1),
(2) Date: Mar. 7, 2024

(87) PCT Pub. No.: WO2023/035888
PCT Pub. Date: Mar. 16, 2023

(65) Prior Publication Data
US 2024/0377933 A1 Nov. 14, 2024

(30) Foreign Application Priority Data

Sep. 8, 2021 (CN) .......................... 202111051771.X

(51) Int. Cl.
*G06F 3/04842* (2022.01)
*G06F 3/0488* (2022.01)

(52) U.S. Cl.
CPC ........ *G06F 3/04842* (2013.01); *G06F 3/0488* (2013.01); *G06F 2203/04803* (2013.01)

(58) Field of Classification Search
CPC .............. G06F 3/04842; G06F 3/0488; G06F 2203/04803
See application file for complete search history.

(56) References Cited

U.S. PATENT DOCUMENTS 7,797,643 B1 * 9/2010 Jobs .................... G06F 3/04847
715/833
2016/0048287 A1 2/2016 Lee et al.
(Continued)

FOREIGN PATENT DOCUMENTS

CN 103713824 A 4/2014
CN 106941000 A 7/2017
(Continued)

OTHER PUBLICATIONS

Martina Radilova et al., Tool for Optimizing Webpages on a Mobile Phone, Jul. 1, 2020, International Conference on Telecomunications and Signal Processing, pp. 1-5 (Year: 2020).*
(Continued)

*Primary Examiner* — Tam T Tran
(74) *Attorney, Agent, or Firm* — Slater Matsil, LLP

(57) ABSTRACT

Embodiments for displaying are provided. In some embodiments, a method includes displaying a first interface. Some methods further include receiving a display instruction from a user. Some embodiments further include displaying a second interface above the first interface in response to the display instruction, where a display size of the second interface is determined based on display content of the second interface.

20 Claims, 26 Drawing Sheets

(56) References Cited

U.S. PATENT DOCUMENTS

| | | | |
|---|---|---|---|
| 2020/0065061 A1* | 2/2020 | Jiang | ........................ G06F 3/167 |
| 2023/0168784 A1* | 6/2023 | Zhang | .............. H04M 1/72469 |
| | | | 715/781 |

FOREIGN PATENT DOCUMENTS

| | | |
|---|---|---|
| CN | 109343916 A | 2/2019 |
| CN | 110865865 A | 3/2020 |
| CN | 111290680 A | 6/2020 |
| CN | 112463006 A | 3/2021 |

OTHER PUBLICATIONS

Sebastian Boring et al., Making Public Displays Interactive Every-where, Mar. 1, 2013, IEEE Computer Graphics and Applications, pp. 28-36 (Year: 2013).*

* cited by examiner

DISPLAY METHOD, ELECTRONIC DEVICE, AND STORAGE MEDIUM

CROSS-REFERENCE TO RELATED APPLICATIONS

This application is a national stage of International Application No. PCT/CN2022/113062, filed on Aug. 17, 2022, which claims priority to Chinese Patent Application 202111051771.X, filed on Sep. 8, 2021. Both of the aforementioned applications are hereby incorporated by reference in their entireties.

TECHNICAL FIELD

The present invention relates to the technical field of smart terminals, and specifically, to a display method, an electronic device, and a storage medium.

BACKGROUND

A dynamic panel (Dynamic Panel) is an interaction window that is displayed in a floating manner on an original display interface of a screen in response to an operation of a user by an electronic device such as a mobile phone. The original display interface of the electronic device such as the mobile phone may be an interface of a running application. For example, the mobile phone currently displays an application interface of running WeChat™. If the user performs, on the application interface, an operation of a shortcut gesture of pressing and holding a picture or text with two fingers to identify content of the picture or text, the mobile phone displays a dynamic panel on the original WeChat™ interface in response to the operation of the user, to display identified content.

Currently, a display mode of a dynamic panel displayed by an electronic device such as a mobile phone is a quasi-half-screen mode. The quasi-half-screen mode means that a window size of the dynamic panel is approximately half of a display size of a screen of the mobile phone. Refer to a dynamic panel 102 that is in the quasi-half-screen mode and that is displayed by a mobile phone 100 shown in FIG. 1B. It may be understood that modes in which a dynamic panel is displayed on an electronic device such as a mobile phone further include a small-size mode with a smaller window size and a quasi-full-screen mode with a larger window size. Refer to a dynamic panel 101 that is in the small-size mode and that is displayed by the mobile phone 100 shown in FIG. 1A and a dynamic panel 103 that is in the quasi-full-screen mode and that is displayed by the mobile phone 100 shown in FIG. 1C. As shown in FIG. 1C, the window size of the dynamic panel 103 in the quasi-full-screen mode may cover most or all of the display region of the screen of the mobile phone.

It may be understood that, when the amount of to-be-displayed content of the dynamic panel is relatively large, if the mobile phone 100 displays by default the dynamic panel 102 in the quasi-half-screen mode, some content in the to-be-displayed content cannot be displayed. To view the content that is not displayed, the user needs to swipe up on the dynamic panel 102 in the quasi-half-screen mode (refer to an operation ① shown in FIG. 1B), or the user needs to drag up the dynamic panel 102 in the quasi-half-screen mode (refer to an operation ② shown in FIG. 1B) to switch to the dynamic panel 103 in the quasi-full-screen mode. In addition, when the user performs the operation ① or the operation ②, if content displayed on the dynamic panel includes a slide control having a slide conflict, and the like, the operation ① or the operation ② performed by the user may cause the mobile phone 100 to incorrectly determine that an object of a slide operation of the user is the slide control in the displayed content, resulting in poor experience of the user.

SUMMARY

Embodiments of this application provide a display method, an electronic device, and a storage medium. The amount of to-be-displayed content of a dynamic panel is determined, and whether a slide control having a slide conflict exists in the to-be-displayed content is determined. Then, a display mode that is of the dynamic panel and that is applicable to a current display situation is determined based on the amount of the to-be-displayed content and whether the slide control having the slide conflict exists in the to-be-displayed content. Dynamic panels corresponding to different display modes have different display sizes. In this way, when the mobile phone displays the dynamic panel in response to an operation of a user, a display mode (or a display size) of the dynamic panel may be properly determined based on the to-be-displayed content. This can not only ensure that the to-be-displayed content is fully displayed, but also properly avoid misjudgment that is on an object of a slide operation of the user, that is caused by the slide conflict, and that leads to poor experience of the user.

According to a first aspect, an embodiment of this application provides a display method, applied to an electronic device. The method includes: The electronic device displays a first interface; the electronic device receives a display instruction from a user for displaying a second interface above the first interface; and the electronic device displays the second interface above the first interface in response to the display instruction, where a display size of the second interface is determined based on display content of the second interface.

In other words, the electronic device can display another interface (namely, the second interface) on an original display interface (namely, the first interface) in response to an operation of the user, to display content (namely, the display content) corresponding to a result of the operation of the user. The display content of the second interface is to-be-displayed content described in the following specific implementations. The size of the second interface displayed by the electronic device may be dynamically determined based on the display content on the second interface. The electronic device may be, for example, a mobile phone 100 described in the following specific embodiments. The first interface may be, for example, a text browsing interface 104 shown in FIG. 2A in the following specific implementations. The second interface may be, for example, a text identification window 105 shown in FIG. 2B in the following specific implementations. A display size of the text identification window 105 may be determined based on display content of the text identification window 105. The display content includes, for example, a segmented word display region 106 shown in FIG. 2B, and an operation button below the segmented word display region 106, for example, a search button 108, a copy button 109, a translation button 11, a share button 112, and a recommended readings region 107.

In a possible implementation of the first aspect, the display instruction includes any one of the following items: a gesture operation performed by the user on the first interface or a voice instruction from the user to the electronic device.

In other words, the display instruction from the user for displaying the second interface above the first interface may be an operation instruction corresponding to a gesture operation performed by the user on the electronic device, or may be a voice instruction from the user. The gesture operation performed by the user on the electronic device may be, for example, an operation of pressing and holding a screen with two fingers on the text browsing interface 104 shown in FIG. 2A and described in the following specific embodiments, or an operation of tapping a time control 861 on a "Have a good sleep" scene interface 860 shown in FIG. 8F and described in the following specific embodiments. The voice instruction from the user may be a voice wakeup instruction preset in an electronic device such as a mobile phone, for example, "Hey Celia, what's the weather like today?"

In a possible implementation of the first aspect, a larger amount of the display content of the second interface indicates a larger display size of the second interface.

In other words, the electronic device may determine the display size of the second interface based on the amount of the display content of the second interface, that is, it is determined that the display size is larger when the amount of the display content is larger. A case in which the amount of the display content is relatively large may correspond, for example, to a case in which the length of to-be-displayed content described in the following specific implementations exceeds a preset length threshold.

In a possible implementation of the first aspect, the method includes: determining the display size of the second interface in the following manners: in a case that the length of the display content is greater than a first length threshold, determining to display the second interface by using a first partial region in a screen of the electronic device; or in a case that the length of the display content is less than the first length threshold, determining to display the second interface by using a second partial region in the screen of the electronic device, where the first partial region is greater than the second partial region.

The first length threshold is a preset length threshold described in the following specific implementations. For example, that the length of the display content of the second interface is greater than the first length threshold is: that the length of to-be-displayed content of a dynamic panel exceeds the preset length threshold, as described in the following specific implementations. In this case, the electronic device such as a mobile phone displays the second interface by using the first partial region in the screen. The first partial region is, for example, a dynamic panel that is in a quasi-full-screen mode and that is described in the following specific implementations, and has a relatively large display size. For example, that the length of the display content of the second interface is less than the first length threshold is: that the length of the to-be-displayed content of the dynamic panel does not exceed the preset length threshold, as described in the following specific implementations. In this case, the electronic device such as a mobile phone displays the second interface by using the second partial region in the screen. The second partial region is, for example, a dynamic panel that is in a quasi-half-screen mode and that is described in the following specific implementations, and has a display size smaller than a display size of the dynamic panel in the quasi-full-screen mode.

In a possible implementation of the first aspect, the first partial region occupies 50% to 100% of the screen of the electronic device; and the second partial region occupies 25% to 75% of the screen of the electronic device.

The first partial region is, for example, the dynamic panel that is in the quasi-full-screen mode and that is described in the following specific implementations. In other words, the display size of the dynamic panel in the quasi-full-screen mode may account for 50% to 100% of the screen of the mobile phone, or may be set to 50% to 100% of the screen of the mobile phone. For example, the display size of the dynamic panel in the quasi-full-screen mode is set to 90% of the screen of the mobile phone. In some other embodiments, the display size of the dynamic panel in the quasi-full-screen mode may also be set to another proper value. This is not limited herein.

The second partial region is, for example, the dynamic panel that is in the quasi-half-screen mode and that is described in the following specific implementations. In other words, the display size of the dynamic panel in the quasi-half-screen mode may account for 25% to 75% of the screen of the mobile phone, or may be set to 25% to 75% of the screen of the mobile phone. For example, the display size of the dynamic panel in the quasi-half-screen mode is set to 50% of the screen of the mobile phone. In some other embodiments, the display size of the dynamic panel in the quasi-half-screen mode may also be set to another proper value. This is not limited herein.

In a possible implementation of the first aspect, the bottom edge of the first partial region is connected to the bottom edge of the screen of the electronic device; and the height of the first partial region is greater than ½ of the height of the screen of the electronic device.

In other words, the bottom of the first partial region is aligned with the bottom of the screen of the electronic device; and the first partial region may be, for example, opened upwards from the bottom of the screen of the electronic device. It may be understood that, the first partial region is, for example, the dynamic panel that is in the quasi-full-screen mode and that is described in the following specific implementations. In this case, the height of the dynamic panel in the quasi-full-screen mode is greater than ½ of the screen of the mobile phone. Correspondingly, the display size of the dynamic panel in the quasi-full-screen mode may occupy 50% to 100% of the screen of the mobile phone. In some embodiments, the width of the dynamic panel in the quasi-full-screen mode may be equal to the width of the screen of the mobile phone; or the width of the dynamic panel in the quasi-full-screen mode may be slightly smaller than the width of the screen of the mobile phone; or the like. This is not limited herein.

In a possible implementation of the first aspect, the bottom edge of the second partial region is connected to the bottom edge of the screen of the electronic device; and the height of the second partial region is between ¼ and ¾ of the height of the screen of the electronic device.

In other words, the bottom of the second partial region is aligned with the bottom of the screen of the electronic device; and the second partial region may be, for example, opened upwards from the bottom of the screen of the electronic device. It may be understood that, the second partial region is, for example, the dynamic panel that is in the quasi-half-screen mode and that is described in the following specific implementations. In this case, the height of the dynamic panel in the quasi-half-screen mode is between ¼ and ¾ of the screen of the mobile phone. Correspondingly, the display size of the dynamic panel in the quasi-half-screen mode may occupy 25% to 75% of the screen of the mobile phone. In some embodiments, the width of the dynamic panel in the quasi-half-screen mode may be equal to the width of the screen of the mobile phone; or the width of the dynamic panel in the quasi-half-screen mode may be slightly smaller than the width of the screen of the mobile phone; or the like. This is not limited herein.

It may be understood that, in some embodiments, the electronic device has, for example, a plurality of screens. For example, the electronic device is a foldable-screen mobile phone. In this case, the screen of the electronic device may be, for example, any one of two screens of the foldable-screen mobile phone, or a home screen of the foldable-screen mobile phone. For example, the user may perform an operation of a shortcut gesture on the home screen, so that the dynamic panel is displayed on the home screen of the foldable-screen mobile phone. In some other embodiments, when the two screens of the foldable-screen mobile phone are combined into one screen to display the first interface, the user may also perform an operation of a shortcut gesture on the displayed first interface, so that the combined screen of the foldable-screen mobile phone displays the dynamic panel. In this case, if the dynamic panel is in the quasi-full-screen mode, the display size of the dynamic panel may be set to 50% to 100% of the size of the combined screen of the foldable-screen mobile phone, for example, 85% or 90%; or if the dynamic panel is in the quasi-half-screen mode, the display size of the dynamic panel may be set to 25% to 75% of the size of the combined screen of the foldable-screen mobile phone, for example, 45% or 50%. This is not limited herein.

In a possible implementation of the first aspect, the display size of the second interface is determined based on the display content of the second interface, whether a slide control having a slide conflict exists in the second interface, and the size of a slide hot spot of the slide control.

In other words, the electronic device may determine the display size of the second interface based on the amount of the display content of the second interface, whether the slide control having the slide conflict exists in the second interface, and whether the size of the slide hot spot of the slide control exceeds a preset size threshold. For example, in a process shown in FIG. 4 or FIG. 9 in the following specific implementations, the mobile phone 100 determines whether the length of to-be-displayed content of the dynamic panel exceeds the preset length threshold, whether the slide control having the slide conflict exists in the to-be-displayed content of the dynamic panel, and whether the size of the slide hot spot of the slide control exceeds the preset size threshold, thereby determining whether a display mode of the dynamic panel is the quasi-full-screen mode or the quasi-half-screen mode.

In a possible implementation of the first aspect, in the method, the display size of the second interface is determined in the following manner: in a case that the slide control having the slide conflict exists in the second interface, the width of the slide hot spot of the slide control is greater than a preset width threshold, and the length of the display content is greater than a second length threshold, determining to display the second interface by using a third partial region in a screen of the electronic device, where the third partial region occupies 50% to 100% of the screen of the electronic device.

For example, in the process shown in FIG. 4 or FIG. 9 in the following specific implementations, when the mobile phone 100 determines that the length of the to-be-displayed content of the dynamic panel exceeds the preset length threshold, that the slide control having the slide conflict exists in the to-be-displayed content of the dynamic panel, and that the size of the slide hot spot of the slide control exceeds the preset size threshold, the display mode of the dynamic panel may be determined as the quasi-full-screen mode. The third partial region is a dynamic panel displayed in the quasi-full-screen mode, that is, the display size of the dynamic panel displayed in the quasi-full-screen mode may be set to 50% to 100% of the screen of the electronic device (for example, the screen of the mobile phone), for example, may be set to 90% of the screen of the mobile phone. This is not limited herein.

In a possible implementation of the first aspect, the bottom edge of the third partial region is connected to the bottom edge of the screen of the electronic device; and the height of the third partial region is greater than ½ of the height of the screen of the electronic device.

For example, the third partial region is a dynamic panel displayed in the quasi-full-screen mode. When the dynamic panel is displayed, the bottom thereof may be connected to the bottom of the screen of the mobile phone. For example, the dynamic panel may be expanded upwards from the bottom of the screen of the mobile phone. The height of an interface corresponding to the dynamic panel displayed in the quasi-full-screen mode is greater than ½ of the screen of the mobile phone. Correspondingly, a display size corresponding to the dynamic panel displayed in the quasi-full-screen mode is greater than 50% of the screen of the mobile phone, or occupies 50% to 100% of the screen of the mobile phone.

In a possible implementation of the first aspect, in the method, the display size of the second interface is determined in the following manner: in a case that the slide control having the slide conflict does not exist in the second interface, the width of the slide hot spot of the slide control is less than the preset width threshold, and the length of the display content is less than the second length threshold, determining to display the second interface by using a fourth partial region in the screen of the electronic device, where the fourth partial region occupies 25% to 75% of the screen of the electronic device.

For example, in the process shown in FIG. 4 or FIG. 9 in the following specific implementations, when the mobile phone 100 determines that the length of the to-be-displayed content of the dynamic panel does not exceed the preset length threshold, that the slide control having the slide conflict does not exist in the to-be-displayed content of the dynamic panel, and that the size of the slide hot spot of the slide control does not exceed the preset size threshold, the display mode of the dynamic panel may be determined as the quasi-half-screen mode. The fourth partial region is a dynamic panel displayed in the quasi-half-screen mode, that is, the display size of the dynamic panel displayed in the quasi-half-screen mode may be set to 25% to 75% of the screen of the electronic device (for example, the screen of the mobile phone), for example, may be set to 50% of the screen of the mobile phone. This is not limited herein.

In a possible implementation of the first aspect, the bottom edge of the fourth partial region is connected to the bottom edge of the screen of the electronic device; and the height of the fourth partial region is between ¼ and ¾ of the height of the screen of the electronic device.

For example, the fourth partial region is a dynamic panel displayed in the quasi-half-screen mode. When the dynamic panel is displayed, the bottom thereof may be connected to the bottom of the screen of the mobile phone. For example, the dynamic panel may be expanded upwards from the bottom of the screen of the mobile phone. The height of an interface corresponding to the dynamic panel displayed in the quasi-half-screen mode is ¼ to ¾ of the screen of the mobile phone. Correspondingly, a display size corresponding to the dynamic panel displayed in the quasi-half-screen mode is 25% to 75% of the screen of the mobile phone.

It may be understood that, in some embodiments, the electronic device has, for example, a plurality of screens. For example, the electronic device is a foldable-screen mobile phone. In this case, the screen of the electronic device may be, for example, any one of two screens of the foldable-screen mobile phone, or a home screen of the foldable-screen mobile phone. For example, the user may perform an operation of a shortcut gesture on the home screen, so that the dynamic panel is displayed on the home screen of the foldable-screen mobile phone. In some other embodiments, when the two screens of the foldable-screen mobile phone are combined into one screen to display the first interface, the user may also perform an operation of a shortcut gesture on the displayed first interface, so that the combined screen of the foldable-screen mobile phone displays the dynamic panel. In this case, if the dynamic panel is in the quasi-full-screen mode, the display size of the dynamic panel may be set to 50% to 100% of the size of the combined screen of the foldable-screen mobile phone, for example, 85% or 90%; or if the dynamic panel is in the quasi-half-screen mode, the display size of the dynamic panel may be set to 25% to 75% of the size of the combined screen of the foldable-screen mobile phone, for example, 45% or 50%. This is not limited herein.

In a possible implementation of the first aspect, the first interface is a display interface of a first application, and the second interface is a display interface of a second application; or the first interface and the second interface are different display interfaces that correspond to different functions of a third application.

In other words, the first interface and the second interface may be display interfaces of different applications, or may be different display interfaces of a same application or different display interfaces corresponding to different functions. For example, the first interface is the text browsing interface 104 (refer to FIG. 2A below) corresponding to an article on subscription account's page opened in WeChat™; and the second interface is the text identification window 105 (refer to FIG. 2B below) that is correspondingly displayed by pressing and holding text on the text browsing interface 104 with two fingers. For another example, the first interface is the "Have a good sleep" scene interface 860 (refer to FIG. 8F below) of an AI Life application; and the second interface is a specified time setting panel 870 (refer to FIG. 8G below) that is correspondingly displayed by tapping the time control 861 on the scene interface 860.

In a possible implementation of the first aspect, the second interface is a dynamic panel.

According to a second aspect, an embodiment of this application provides an electronic device. The device includes one or more processors and one or more memories. The one or more memories store one or more programs. When the one or more programs are executed by the one or more processors, the electronic device is enabled to perform the foregoing display method.

According to a third aspect, an embodiment of this application provides a computer-readable storage medium. The storage medium stores instructions. When the instructions are executed on a computer, the computer is enabled to perform the foregoing display method.

According to a fourth aspect, an embodiment of this application provides a computer program product, including a computer program or instructions. When the computer program or instructions are executed by a processor on a computer, the computer is enabled to perform the foregoing display method.

DETAILED DESCRIPTION OF ILLUSTRATIVE EMBODIMENTS

Figure 1A:
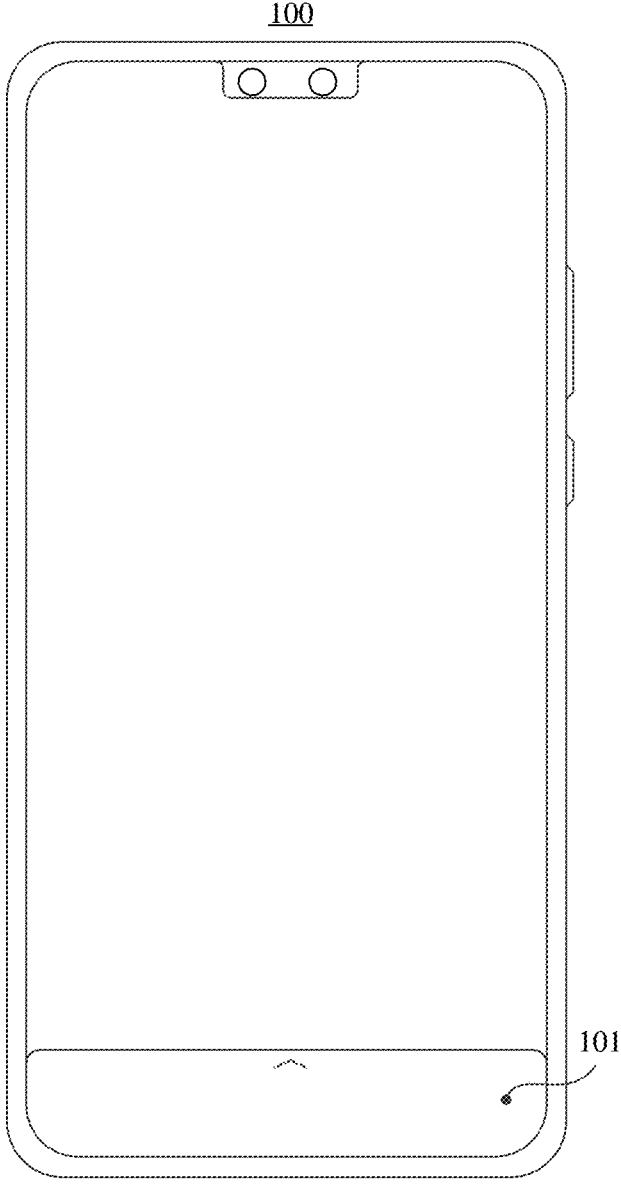
FIG. 1A to FIG. 1C are schematic diagrams of interfaces corresponding to various display modes of a dynamic panel displayed by a mobile phone 100 according to an embodiment of this application.
Figure 1B:
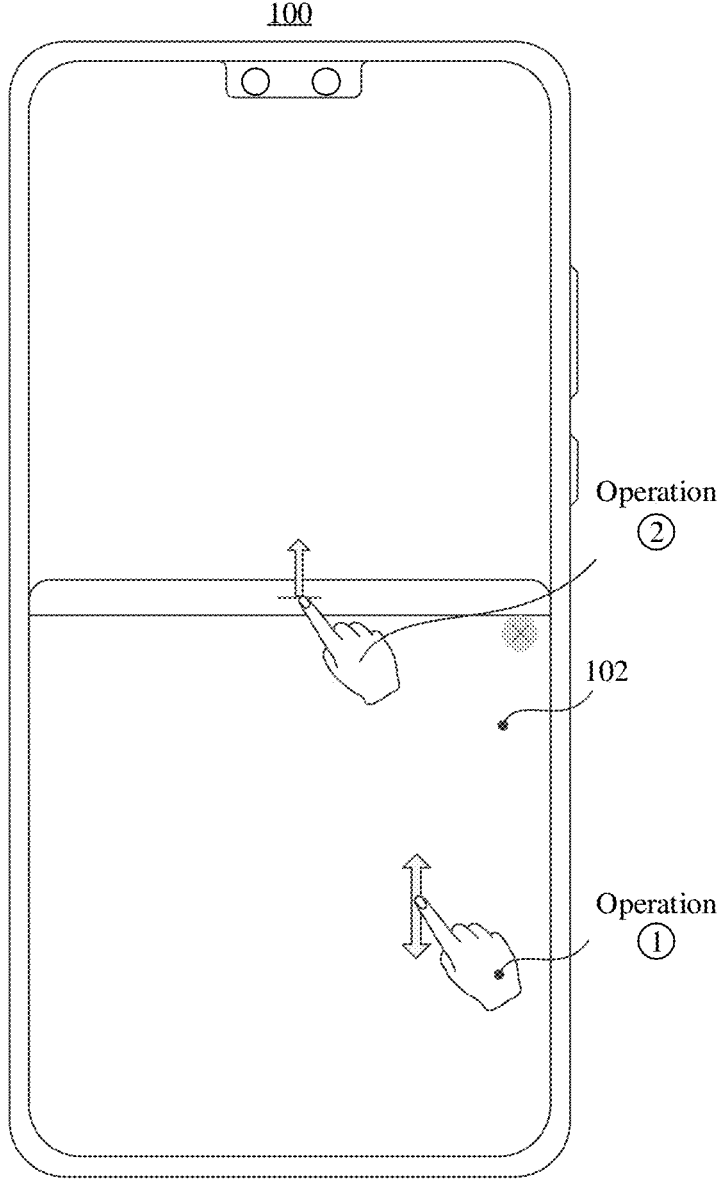
Figure 1C:
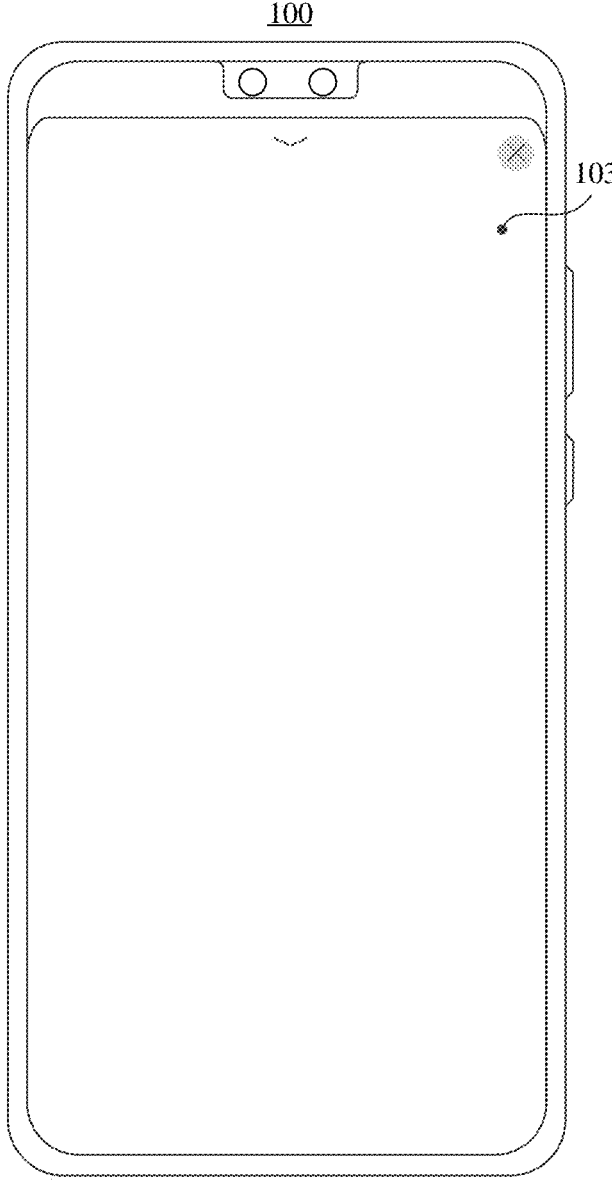

This application is further described below with reference to specific embodiments and accompanying drawings. It may be understood that the specific embodiments described herein are merely intended to explain this application, but not to limit this application. In addition, for ease of description, the accompanying drawings show only some but not all structures or processes related to this application. It should be noted that in this specification, similar reference numerals and letters represent similar items in the following figures.

An illustrative embodiment of this application includes but is not limited to a display method by which a display mode of a dynamic panel can be adjusted dynamically, an electronic device, a storage medium, and the like.

As described above, there are the following problems in an existing scene in which an electronic device such as a mobile phone 100 displays a dynamic panel: When to-be-displayed content is relatively long, display content of the dynamic panel that is in a quasi-half-screen mode by default is incomplete. As a result, some content is prone to be ignored by a user. Alternatively, when a slide control having a slide conflict exists in to-be-displayed content, the electronic device incorrectly determines an object of a slide operation of a user. That the slide control has the slide conflict means that a slide hot spot of the slide control overlaps a slide hot spot of the dynamic panel, and that the two slide hot spots interact with the user in a same manner. For example, both the slide hot spot of the slide control and the slide hot spot of the dynamic panel interact with the user by responding to an up/down slide operation of the user. For details, refer to FIG. 6D and related descriptions below. Details are not described herein again.

To resolve the foregoing problem, this application provides a display method by which a display mode of a dynamic panel can be adjusted dynamically. Specifically, in the method, the amount of to-be-displayed content of a dynamic panel is determined, and whether a slide control having a slide conflict exists in the to-be-displayed content is determined. Then, a display mode that is of the dynamic panel and that is applicable to a current display situation is determined based on the amount of the to-be-displayed content and whether the slide control having the slide conflict exists in the to-be-displayed content. For example, if the amount of the to-be-displayed content is relatively small, or the slide control having the slide conflict does not exist in the to-be-displayed content, the mobile phone may determine the display mode of the dynamic panel as a quasi-half-screen mode; or if the amount of the to-be-displayed content is relatively large, and the slide control having the slide conflict exists in the to-be-displayed content, the mobile phone may determine the display mode of the dynamic panel as a quasi-full-screen mode. In this way, when the mobile phone displays the dynamic panel in response to an operation of a user, a display mode of the dynamic panel may be properly determined based on the to-be-displayed content. This can not only ensure that the to-be-displayed content is fully displayed, but also properly avoid misjudgment that is on an object of a slide operation of the user, that is caused by the slide conflict, and that leads to poor experience of the user.

Figure 2A:
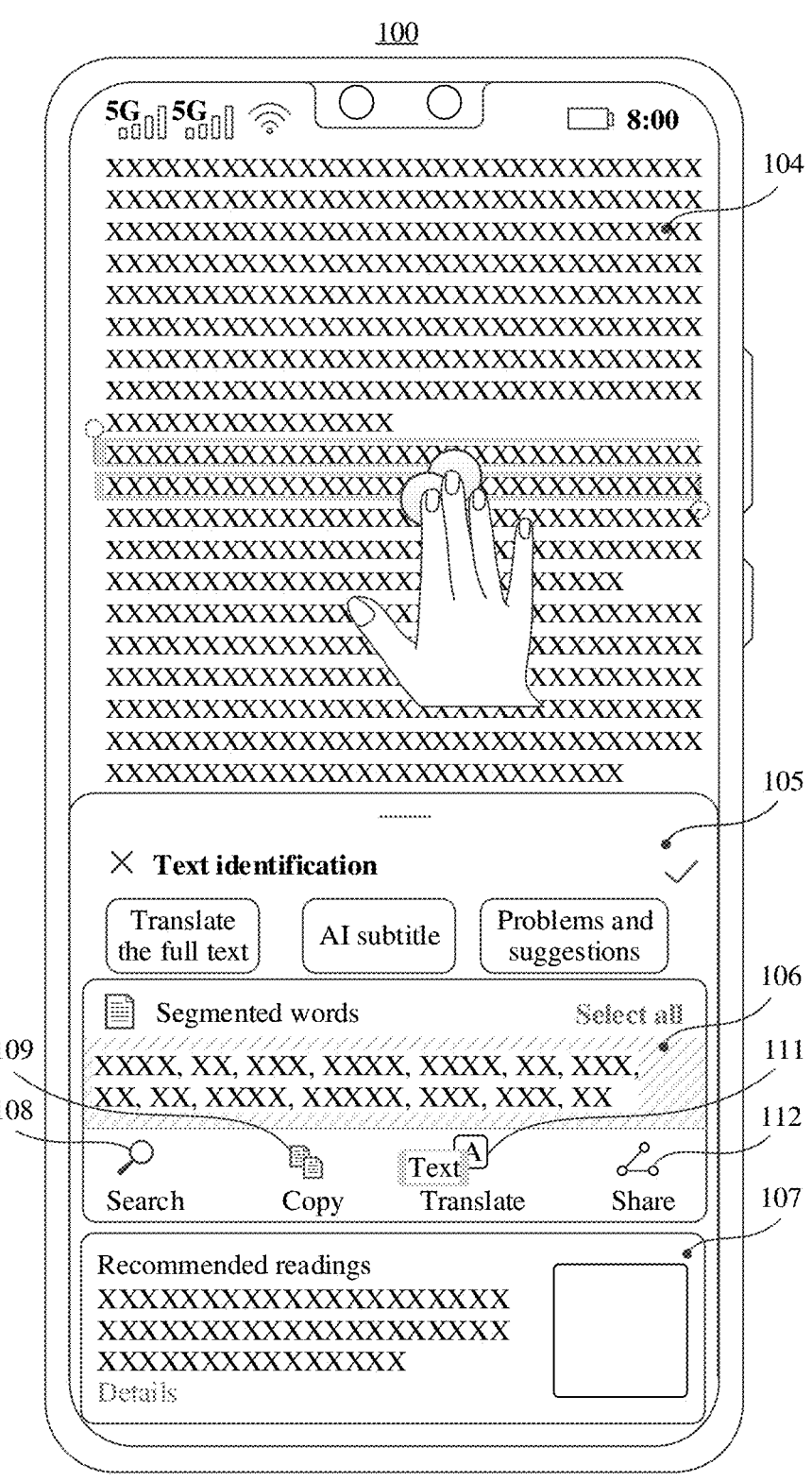
FIG. 2A is a schematic diagram of an example interface in which a mobile phone 100 displays to-be-displayed content in a dynamic panel 102 in a quasi-half-screen mode by default in response to an operation of a user according to an embodiment of this application.

For example, FIG. 2A is a schematic diagram of an interface in which a mobile phone 100 displays to-be-displayed content in a dynamic panel 102 in a quasi-half-screen mode by default in response to an operation of a user.

As shown in FIG. 2A, the user performs, on a text browsing interface 104 displayed by the mobile phone 100, an operation of a shortcut gesture of pressing and holding text or a picture on a screen with two fingers, so that the mobile phone 100 displays a dynamic panel corresponding to the shortcut gesture, for example, a text identification window 105 shown in FIG. 2A. As shown in FIG. 2A, content displayed in the text identification window 105 includes: a segmented word display region 106 and an operation button below the segmented word display region 106, for example, a search button 108, a copy button 109, a translation button in, a share button 112, and a recommended readings region 107. In this case, the amount of to-beidentified text 113 selected by the user is relatively small. Therefore, the amount of content of segmented words displayed in the segmented word display region 106 is also relatively small, and the amount of to-be-displayed content of the text identification window 105 is relatively small, that is, the length of space occupation (herein referred to as "length") of the to-be-displayed content of the text identification window 105 is also relatively small.

In this case, the mobile phone 100 displays a dynamic panel (namely, the text identification window 105) on an original display interface (namely, the text browsing interface 104) in response to the operation of the shortcut gesture performed by the user. The mobile phone 100 may obtain the to-be-displayed content of the text identification window 105, and determine the length of (space occupation of) the to-be-displayed content based on text, a control, typesetting, or the like corresponding to the segmented word display region 106 shown in FIG. 2A, the operation button below the segmented word display region 106, and the recommended readings region 107, thereby determining a display mode of the text identification window 105 as the quasi-half-screen mode, namely, a display mode of the text identification window 105 shown in FIG. 2A.

Figure 2B:
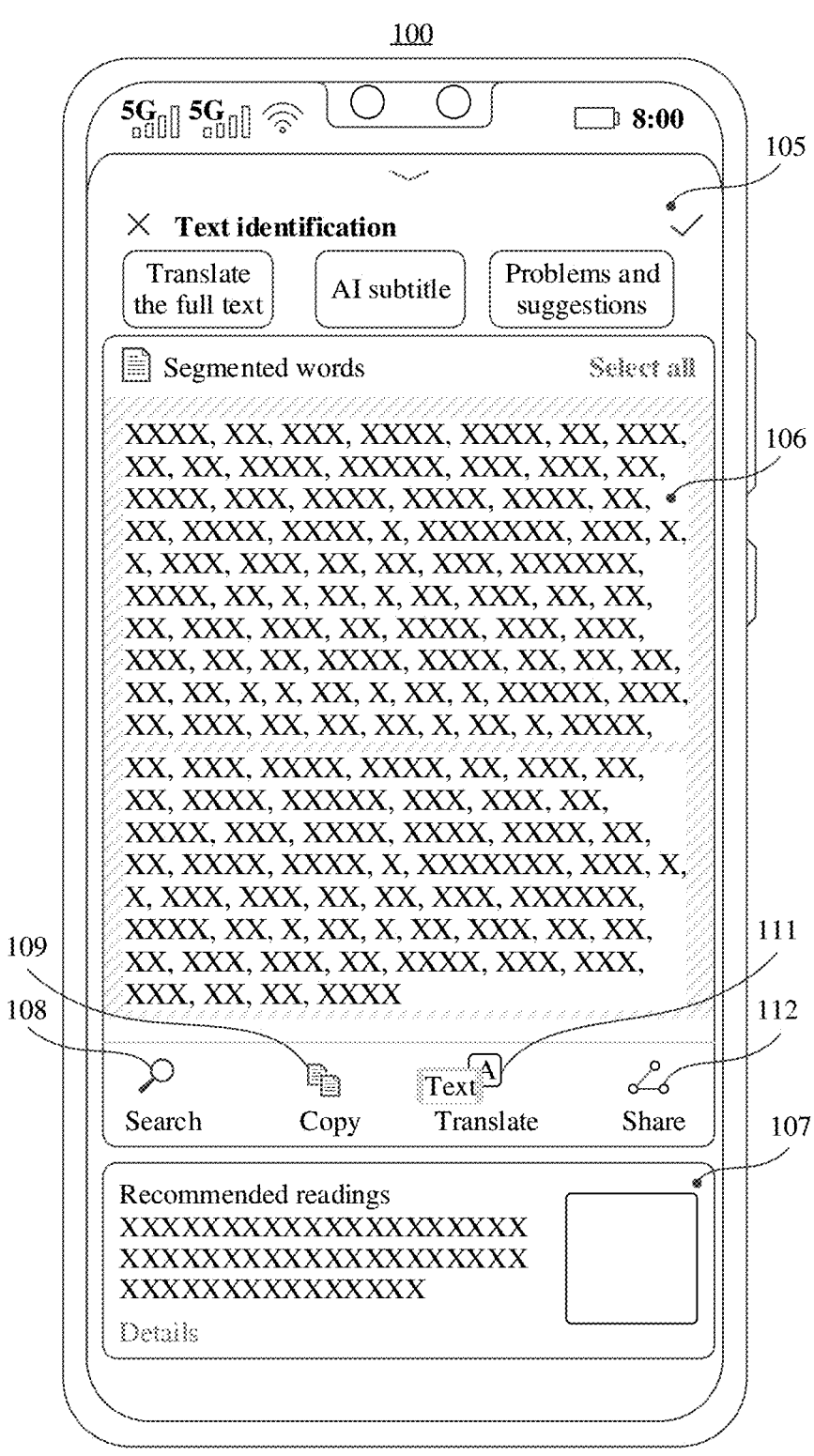
FIG. 2B is a schematic diagram of an interface in which a mobile phone 100 displays to-be-displayed content in a dynamic panel 102 in a quasi-full-screen mode by default in response to an operation of a user according to an embodiment of this application.

FIG. 2B is a schematic diagram of an interface in which a mobile phone 100 displays a dynamic panel 102 in a quasi-full-screen mode in response to an operation of a user.

As shown in FIG. 2B, when the user performs, on the text browsing interface 104 displayed by the mobile phone 100, an operation of a shortcut gesture of pressing and holding text or a picture on a screen with two fingers, if the amount of text 113 selected by the operation of the user is relatively large, the quantity of segmented words correspondingly displayed in a segmented word display region 106 is relatively large. For example, the segmented words are segmented words displayed in the segmented word display region 106 shown in FIG. 2B. Therefore, the length of the to-be-displayed content of the text identification window 105, namely, content corresponding to the segmented word display region 106 shown in FIG. 2B and a search button 108, a copy button 109, a translation button 11, a share button 112, and a recommended readings region 107 below the segmented word display region 106, is also relatively large. It can be understood that, if to-be-displayed content shown in FIG. 2B is displayed by using the text identification window 105 in a quasi-half-screen mode, some segmented words are not displayed in the segmented word display region 106, and a region that is in the segmented word display region 106 and in which segmented words are displayed is provided with a slide control that enables the user to view undisplayed segmented words by performing up/down sliding. In this case, a slide conflict exists between the slide control provided in the segmented word display region 106 and a slide control corresponding to the text identification window 105.

Therefore, in a scene of an interface shown in FIG. 2B, the mobile phone 100 obtains the to-be-displayed content of the text identification window 105, and determines a display mode of the text identification window 105 as the quasi-full-screen mode, namely, a display mode of the text identification window 105 shown in FIG. 2B, based on the length of the to-be-displayed content, for example, the length of the to-be-displayed content shown in FIG. 2B.

It may be understood that the foregoing electronic device that displays the dynamic panel on the original display interface in response to the operation of the user includes but is not limited to a mobile phone, a smart screen, a desktop computer, a tablet computer, a laptop computer, a wearable device, a head-mounted display, a mobile email device, a portable game console, a portable music player, a reader device, a personal digital assistant (personal digital assistant, PDA), a virtual reality (virtual reality, VR)/an augmented reality (augmented reality, AR) device, an ultra-mobile personal computer (ultra-mobile personal computer, UMPC), a netbook, or a television in/to which one or more processors are embedded/coupled. For ease of description, that the electronic device is the mobile phone 100 is used as an example below to describe aspects of specific implementations of the display method for dynamically adjusting a display mode of a dynamic panel in this application.

Figure 3:
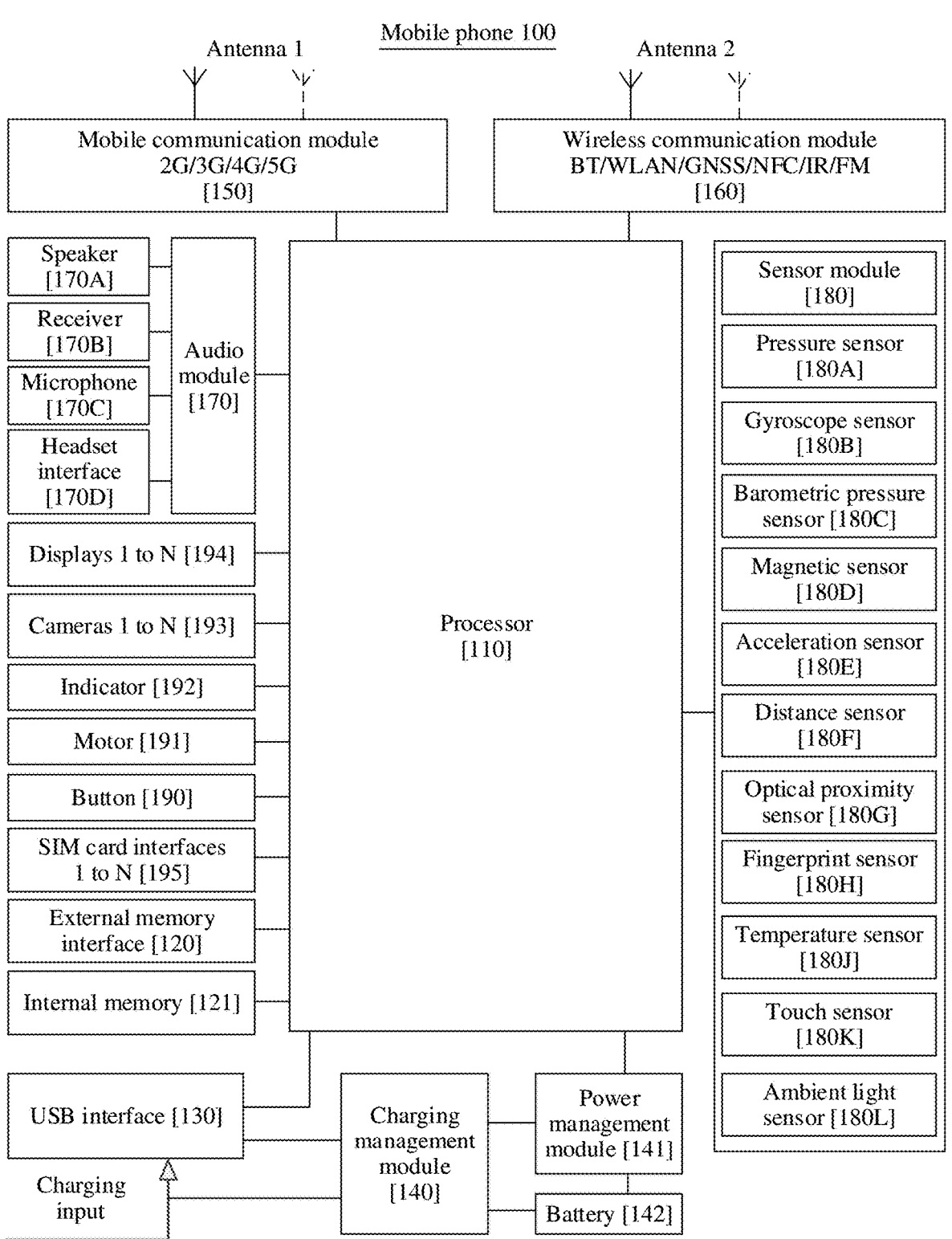
FIG. 3 is a schematic diagram of a structure of a mobile phone 100 according to an embodiment of this application.

For example, FIG. 3 is a schematic diagram of a structure of a mobile phone 100.

As shown in FIG. 3, the mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset interface 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and the like.

It may be understood that a structure illustrated in this embodiment of the present invention does not constitute a specific limitation on the mobile phone 100. In some other embodiments of this application, the mobile phone 100 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on instruction operation code and a time sequence signal, to complete control of instruction invoking and instruction execution. For example, in this embodiment of this application, the processor 110 may control, by using the controller, invoking and execution of related instructions of the display method of this application, to implement the display method of this application.

The processor 110 may be further provided with a memory, configured to store instructions and data. In some embodiments, the memory in the processor 110 is a cache. The memory may store instructions or data that has just been used or used repeatedly by the processor 110. If the processor 110 needs to use the instructions or the data again, the processor may directly invoke the instructions or the data from the memory. This avoids repeated access, and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The USB interface 130 is an interface conforming to a USB standard specification, and may be specifically a mini USB interface, a micro USB interface, a USB Type-C interface, or the like. The USB interface 130 may be configured to connect to a charger to charge the mobile phone 100, or may be configured to transmit data between the mobile phone 100 and a peripheral device, or may be configured to connect to a headset, to play audio through the headset. The interface may be further configured to connect to another electronic device, for example, an AR device.

It may be understood that an interface connection relationship, between modules, illustrated in this embodiment of the present invention is merely an example for description, and does not constitute a limitation on a structure of the mobile phone 100. In some other embodiments of this application, the mobile phone 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the mobile phone 100. The charging management module 140 may further supply power to the electronic device by using the power management module 141 while charging the battery 142.

The power management module 141 is configured to connect the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage and impedance). In some other embodiments, the power management module 141 may alternatively be disposed in the processor 110. In still some other embodiments, the power management module 141 and the charging management module 140 may also be provided in a same device.

A wireless communication function of the mobile phone 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile phone 100 may be configured to cover one or more communication bands. Different antennas may be further multiplexed, to improve antenna utilization.

The mobile communication module 150 may provide a solution applied to the mobile phone 100 for wireless communication such as 2G/3G/4G/5G.

The wireless communication module 160 may provide a wireless communication solution that is applied to the mobile phone 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs frequency modulation and filtering on the electromagnetic wave signal, and sends a processed signal to the processor 110. The wireless communication module 160 may further receive a to-be-sent signal from the processor 110, perform frequency modulation and amplification on the signal, and convert, through the antenna 2, a frequency-modulated and amplified signal into an electromagnetic wave for radiation.

In some embodiments, in the mobile phone 100, the antenna 1 and the mobile communication module 150 are coupled, and the antenna 2 and the wireless communication module 160 are coupled, so that the mobile phone 100 can communicate with a network and another device by using a wireless communication technology. The wireless communication technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The mobile phone 100 implements a display function by using the GPU, the display 194, the application processor, and the like. The GPU is a microprocessor for image processing, and is connected to the display 194 and the application processor. The GPU is configured to perform mathematical and geometric computation for graphics rendering. The processor 110 may include one or more GPUs that execute program instructions to generate or change display information. For example, in this embodiment of this application, the mobile phone 100 implements a display function of a dynamic panel by using the GPU, the display 194, the application processor, and the like. In addition, the mobile phone 100 may determine a display mode of the dynamic panel based on a result of determining, by the application processor or the processor 110, the amount of content that needs to be displayed on the dynamic panel, whether a slide control having a slide conflict exists, and so on. The mobile phone 100 displays, by using the GPU, the display 194, the application processor, and the like in a finally determined display mode, the content that needs to be displayed on the dynamic panel.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the mobile phone 100 may include one or N displays 194, where N is a positive integer greater than 1.

The mobile phone 100 may implement a photographing function by using the ISP, the camera 193, the video codec, the GPU, the display 194, the application processor, and the like. The ISP is configured to process data fed back by the camera 193. The camera 193 is configured to capture a static image or a video. In some embodiments, the mobile phone 100 may include one or N cameras 193, where N is a positive integer greater than 1. The video codec is configured to compress or decompress a digital video. The mobile phone 100 may support one or more types of video codecs. In this way, the mobile phone 100 may play or record videos in a plurality of coding formats, for example, moving picture experts group (moving picture experts group, MPEG)-1, MPEG-2, MPEG-3, and MPEG-4.

The external memory interface 120 may be configured to connect to an external memory card, for example, a micro SD card, to extend a storage capability of the mobile phone 100. The external memory card communicates with the processor 110 through the external memory interface 120, to implement a data storage function. For example, files such as a music file and a video file are stored in the external memory card.

The internal memory 121 may be configured to store computer-executable program code. The computer-executable program code includes instructions. The internal memory 121 may include a program storage area and a data storage area. The program storage area may store an operating system, an application required by at least one function (for example, a sound playing function and an image playing function), and the like. The data storage area may store data (such as audio data and a phone book) created during use of the mobile phone 100, and the like. In addition, the internal memory 121 may include a high-speed random access memory, and may further include a non-volatile memory, for example, at least one magnetic disk storage device, a flash memory, or a universal flash storage (universal flash storage, UFS). The processor 110 executes various functional applications and data processing of the mobile phone 100 by running the instructions stored in the internal memory 121 and/or the instructions stored in the memory that is disposed in the processor. For example, in this embodiment of this application, corresponding instructions of the display method provided in this application are stored in the internal memory 121. The processor 110 of the mobile phone 100 runs the corresponding instructions that are of the display method and that are stored in the internal memory 121, to perform a process of determining, by the mobile phone 100, whether the length of content on a to-be-displayed dynamic panel exceeds a preset length threshold, determining whether to-be-displayed content includes a slide control having a slide conflict, and so on, thereby determining a display mode of the dynamic panel.

The mobile phone 100 may use the audio module 170, the speaker 170A, the receiver 170B, the microphone 170C, the headset interface 170D, the application processor, and the like to implement an audio function, for example, music playback and sound recording.

The audio module 170 is configured to convert digital audio information into an analog audio signal for output, and convert an analog audio input into a digital audio signal.

The speaker 170A, also referred to as a "loudspeaker", is configured to convert an audio electrical signal into a sound signal. The mobile phone 100 may be used to listen to music or answer a call in a hands-free mode by using the speaker 170A.

The receiver 170B, also referred to as an "earpiece", is configured to convert an electrical audio signal into a sound signal. A person using the mobile phone 100 may answer a call or listen to a voice message by moving the receiver 170B close to his/her ear.

The microphone 170C, also referred to as a "mike" or a "mic", is configured to convert a sound signal into an electrical signal. When making a call or sending a voice message, a user may make a sound with the microphone 170C close to his/her mouth, so as to input a sound signal to the microphone 170C. The headset interface 170D is configured to connect to a wired headset.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates having conductive materials. When a force is applied to the pressure sensor 180A, capacitance between electrodes changes. The mobile phone 100 determines pressure intensity based on the change of the capacitance. When a touch operation is performed on the display 194, the mobile phone 100 detects intensity of the touch operation by using the pressure sensor 180A. The mobile phone 100 may further calculate a touch position based on a detection signal of the pressure sensor 180A. For example, in this embodiment of this application, the mobile phone 100 may obtain two touch positions through calculation based on the detection signal of the pressure sensor 180A, to determine user's operation of pressing and holding a picture or text on a screen with two fingers, thereby implementing a process of displaying a text identification interface 105 in response to the operation of the user.

In some other embodiments, touch operations that are performed at same touch positions but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is executed.

The gyroscope sensor 180B may be configured to determine a motion gesture of the mobile phone 100.

The barometric pressure sensor 180C is configured to measure a barometric pressure. In some embodiments, the mobile phone 100 calculates an altitude based on a value of the barometric pressure measured by the barometric pressure sensor 180C, to assist in positioning and navigation.

The magnetic sensor 180D includes a Hall sensor. The mobile phone 100 may detect opening and closing of a flap/leather case by using the magnetic sensor 180D. In some embodiments, when the mobile phone 100 is a clamshell phone, the mobile phone 100 may detect opening and closing of a flap by using the magnetic sensor 180D. Further, a feature such as automatic unlocking upon uncovering is set based on a detected opening or closing state of a leather case or a flap.

The acceleration sensor 180E may detect values of acceleration of the mobile phone 100 in various directions (generally along three axes), may detect a value and a direction of gravity when the mobile phone 100 is static, and may be further configured to identify a gesture of the electronic device, thereby being used in applications such as screen switching between a landscape mode and a portrait mode, and a pedometer.

The distance sensor 180F is configured to measure a distance. The mobile phone 100 may measure the distance in an infrared manner or a laser manner. In some embodiments, the mobile phone 100 may measure a distance in a photographing scene by using the distance sensor 180F, to implement quick focusing.

For example, the optical proximity sensor 180G may include a light-emitting diode (LED) and an optical detector, for example, a photodiode. The mobile phone 100 may detect, by using the optical proximity sensor 180G, that the user holds the mobile phone 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The mobile phone 100 may adaptively adjust brightness of the display 194 based on the sensed ambient light brightness. The ambient light sensor 180L may be further configured to automatically adjust white balance during photographing. The ambient light sensor 180L may further cooperate with the optical proximity sensor 180G in detecting whether the mobile phone 100 is in a pocket, to avoid an accidental touch.

The fingerprint sensor 180H is configured to collect a fingerprint. The mobile phone 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the mobile phone 100 executes a temperature processing policy based on the temperature detected by the temperature sensor 18J. For example, when the temperature reported by the temperature sensor 180J exceeds a threshold, the mobile phone 100 lowers performance of a processor near the temperature sensor 180J, to reduce power consumption for thermal protection. In some other embodiments, when the temperature is lower than another threshold, the mobile phone 100 heats the battery 142 to prevent the mobile phone 100 from being shut down abnormally because of a low temperature. In some other embodiments, when the temperature is lower than still another threshold, the mobile phone 100 boosts an output voltage of the battery 142 to avoid abnormal shutdown caused by a low temperature.

The touch sensor 180K is also referred to as a "touch component". The touch sensor 180K may be disposed on the display 194. The touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided on the display 194. In some other embodiments, the touch sensor 180K may alternatively be disposed on a surface of the mobile phone 100 at a position different from that of the display 194.

The button 190 includes a power button, a volume button, and the like. The button 190 may be a mechanical button or a touch button. The mobile phone 100 may receive a button input, and generate a button signal input related to a user setting and function control of the mobile phone 100.

The motor 191 may generate a vibration prompt. The motor 191 may be configured to produce an incoming call vibration prompt and a touch vibration feedback. For example, touch operations performed on different applications (for example, photographing and audio playback) may correspond to different vibration feedback effects. For touch operations performed on different areas of the display 194, the motor 191 may further produce different vibration feedback effects correspondingly. Different application scenes (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like. The SIM card interface 195 is configured to connect to a SIM card.

Based on the scenes of the interfaces shown in FIG. 2A and FIG. 2B and the example structure of the mobile phone 100 shown in FIG. 3, the following describes in detail a specific implementation process of the display method of this application with reference to other accompanying drawings.

Figure 4:
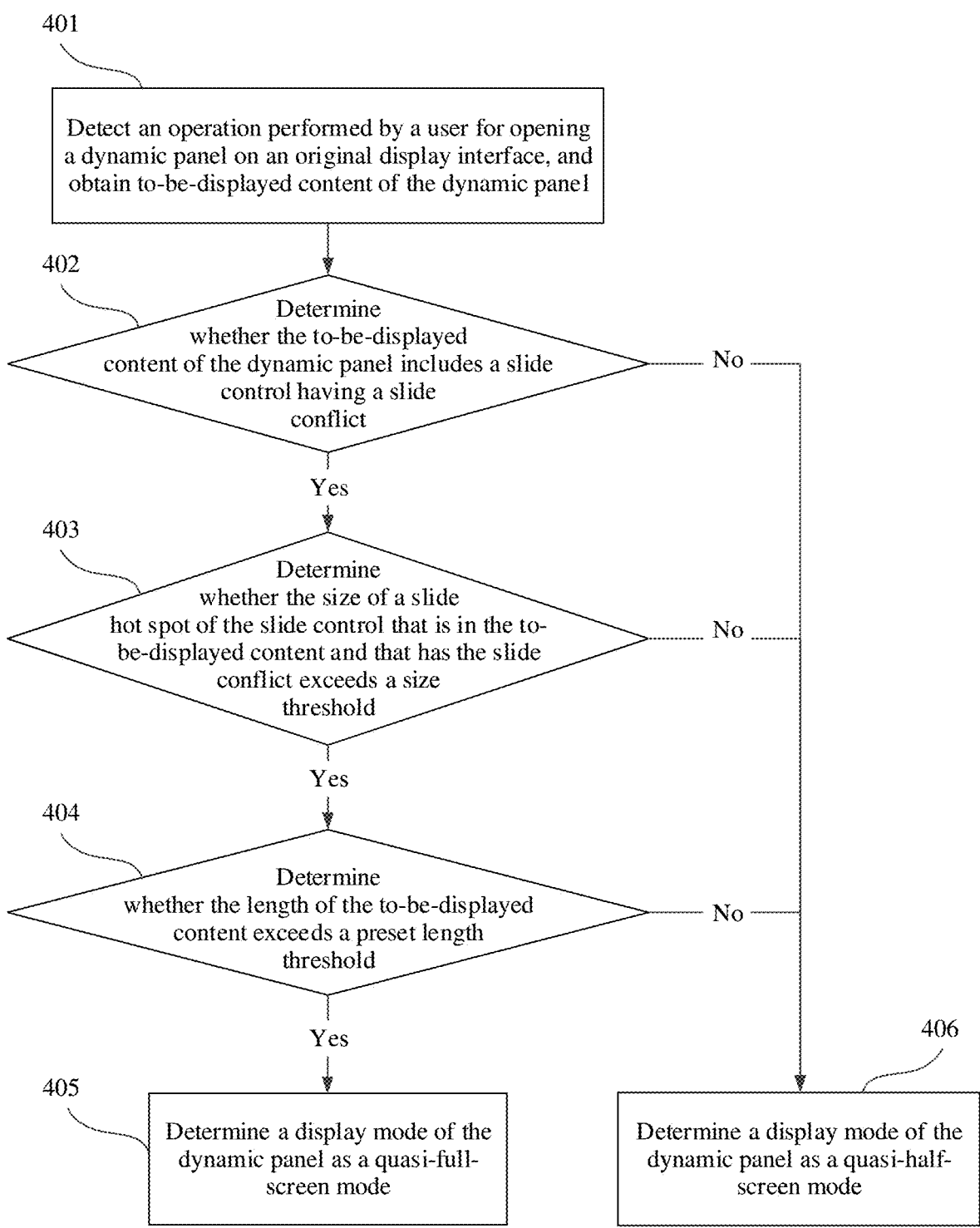
FIG. 4 is a schematic diagram of a specific process for implementing a display method of this application by a mobile phone 100 according to an embodiment of this application.

FIG. 4 is a schematic diagram of a specific process for implementing a display method of this application by the mobile phone 100. In the process shown in FIG. 4, first, whether to-be-displayed content of a dynamic panel includes a slide control having a slide conflict is determined, and the size of a slide hot spot of the slide control is determined. If the slide control having the slide conflict exists in the to-be-displayed content and the size of the slide hot spot of the control is relatively large, it indicates that the slide control that is in the to-be-displayed content and that has the slide conflict is large enough to cause misjudgment of a slide operation performed by a user on the dynamic panel. Then, the amount of the to-be-displayed content is further determined, to determine a display mode of the dynamic panel. If the amount of the to-be-displayed content is relatively large, the display mode of the dynamic panel is determined as a quasi-full-screen mode. On the contrary, if the slide control having the slide conflict does not exist in the to-be-displayed content, or the size of the slide hot spot of the slide control having the slide conflict is relatively small and is not large enough to cause the misjudgment of the slide operation performed by the user on the dynamic panel, or the amount of the to-be-displayed content is relatively small, the display mode of the dynamic panel may be determined as a quasi-half-screen mode.

Specifically, as shown in FIG. 4, the process includes the following steps 401 to 406. Each step of the process may be performed by the mobile phone 100.

401: Detect an operation performed by a user for opening a dynamic panel on an original display interface, and obtain to-be-displayed content of the dynamic panel.

For example, the user may perform a preset shortcut gesture on the original display interface of the mobile phone 100, thereby invoking another application to open the dynamic panel. For example, the user performs an operation of a shortcut gesture of pressing and holding a screen of the mobile phone 100 with two fingers, as shown in FIG. 2A. After the mobile phone 100 detects the operation of the user, the processor 110 of the mobile phone 100 may obtain to-be-displayed content corresponding to the operation, for example, content displayed in the text identification window 105 shown in FIG. 2A. Then, the following step 402 is performed. The processor 110 of the mobile phone 100 may obtain the to-be-displayed content by using, for example, a window manager that is in a system of the mobile phone 100 and that manages and displays the dynamic panel. This is not limited herein.

It may be understood that the original display interface of the mobile phone 100 may be an interface of any application running on the mobile phone 100. For example, the original display interface may be a setting interface, a WeChat™ interface, a player interface, a browser interface, a gallery interface, a camera interface, a MicroBlog™ interface, a reader interface, an email interface, a game interface, or the like.

It may be understood that, an intelligent screen identification scene that is illustrated in FIG. 2A and that corresponds to the shortcut gesture of pressing and holding with two fingers is implemented on the premise that an intelligent screen identification function has been enabled on the mobile phone 100. If the intelligent screen identification function has not been enabled on the mobile phone 100, the user may operate the mobile phone 100 in the following manner, to enable the function.

For example, for an interface change process corresponding to the operation performed by the user for opening the dynamic panel on the original display interface of the mobile phone 100, refer to FIG. 5A to FIG. 5D.

Figure 5A:
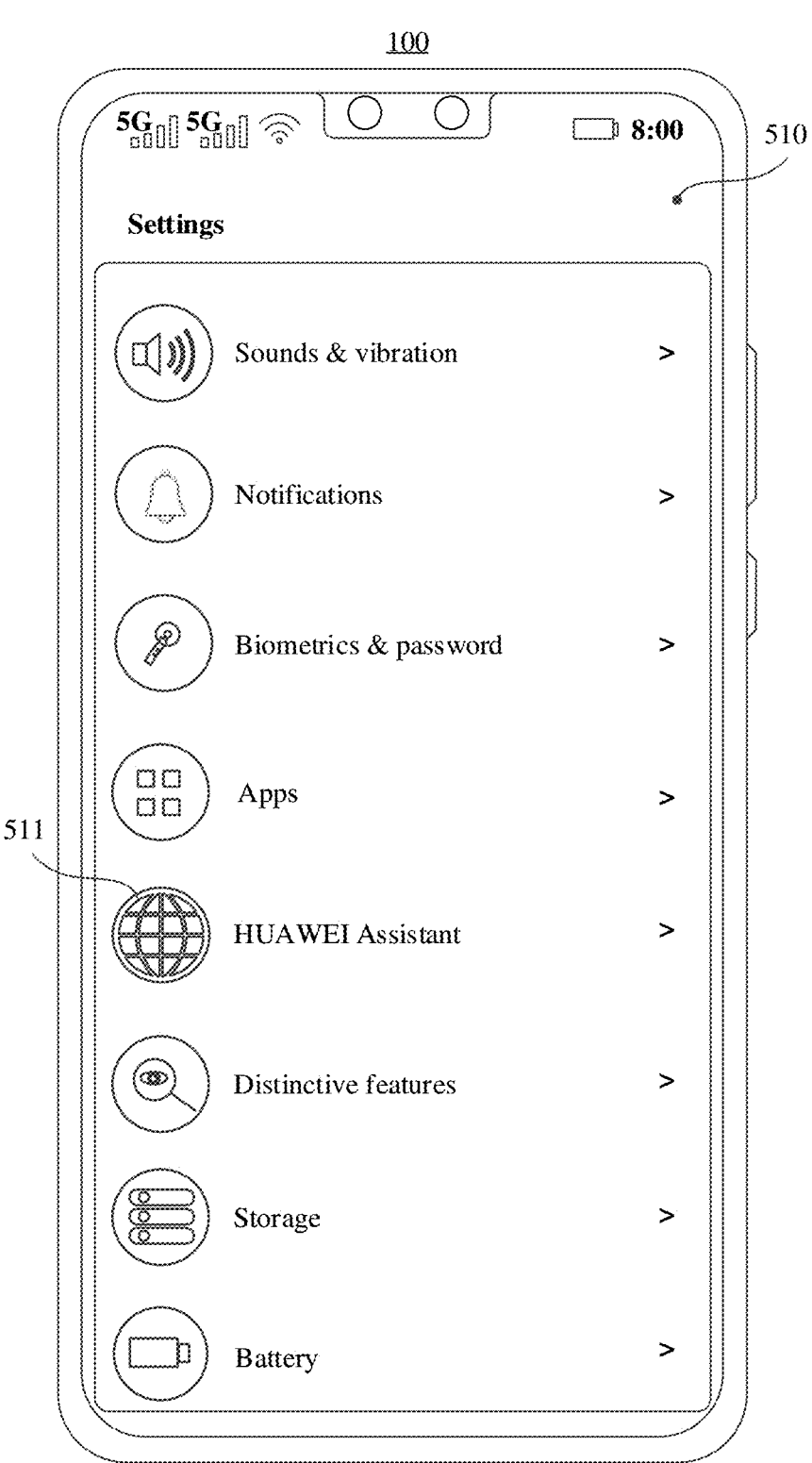
FIG. 5A to FIG. 5C are schematic diagrams of related interfaces for enabling an intelligent screen identification function of HUAWEI Assistant on a mobile phone 100 according to an embodiment of this application.
Figure 5B:
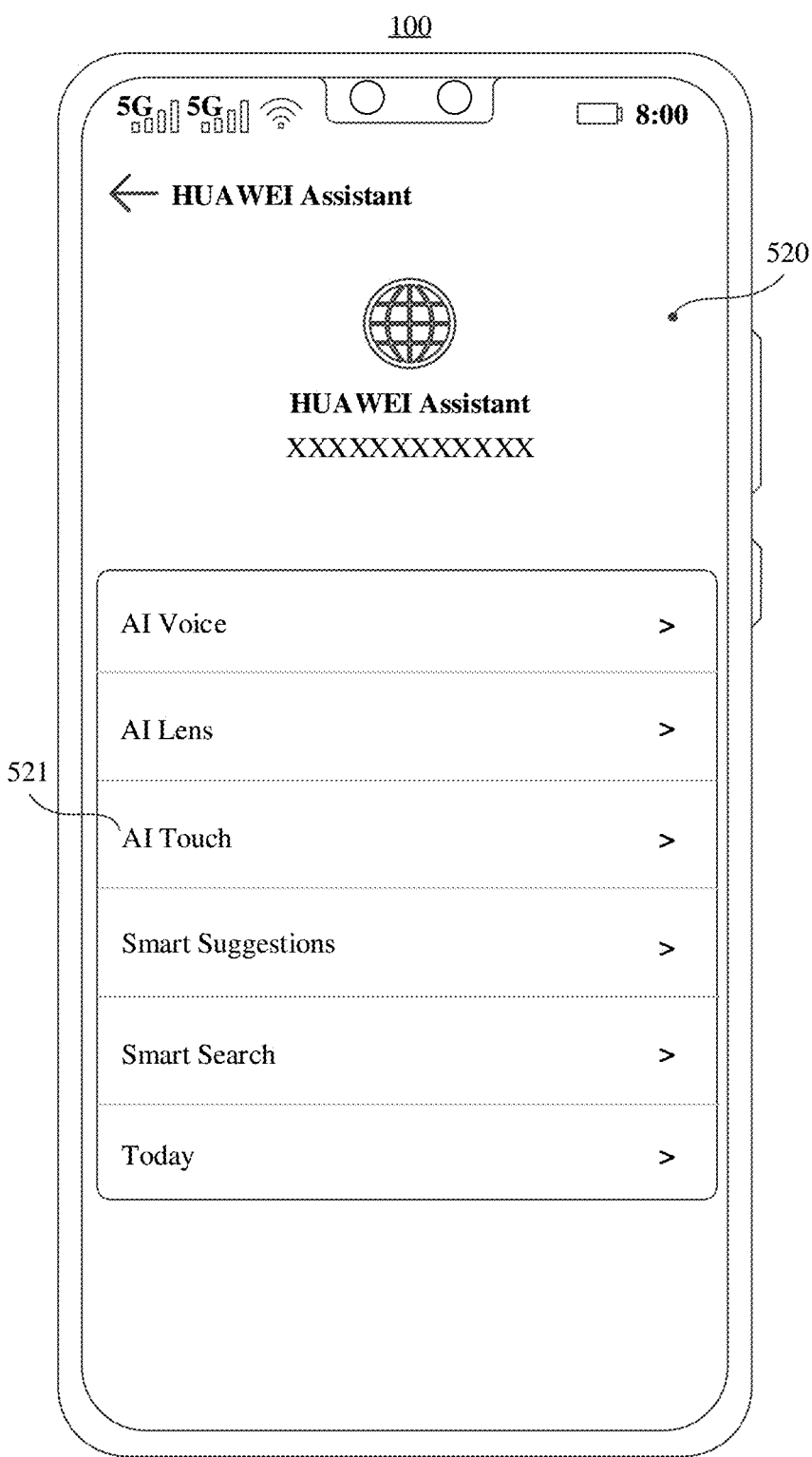

Specifically, a HUAWEI Assistant application interface 520 shown in FIG. 5B may be displayed when a HUAWEI Assistant application option 511 on a setting interface 510 of the mobile phone 100 is tapped as shown in FIG. 5A.

Figure 5C:
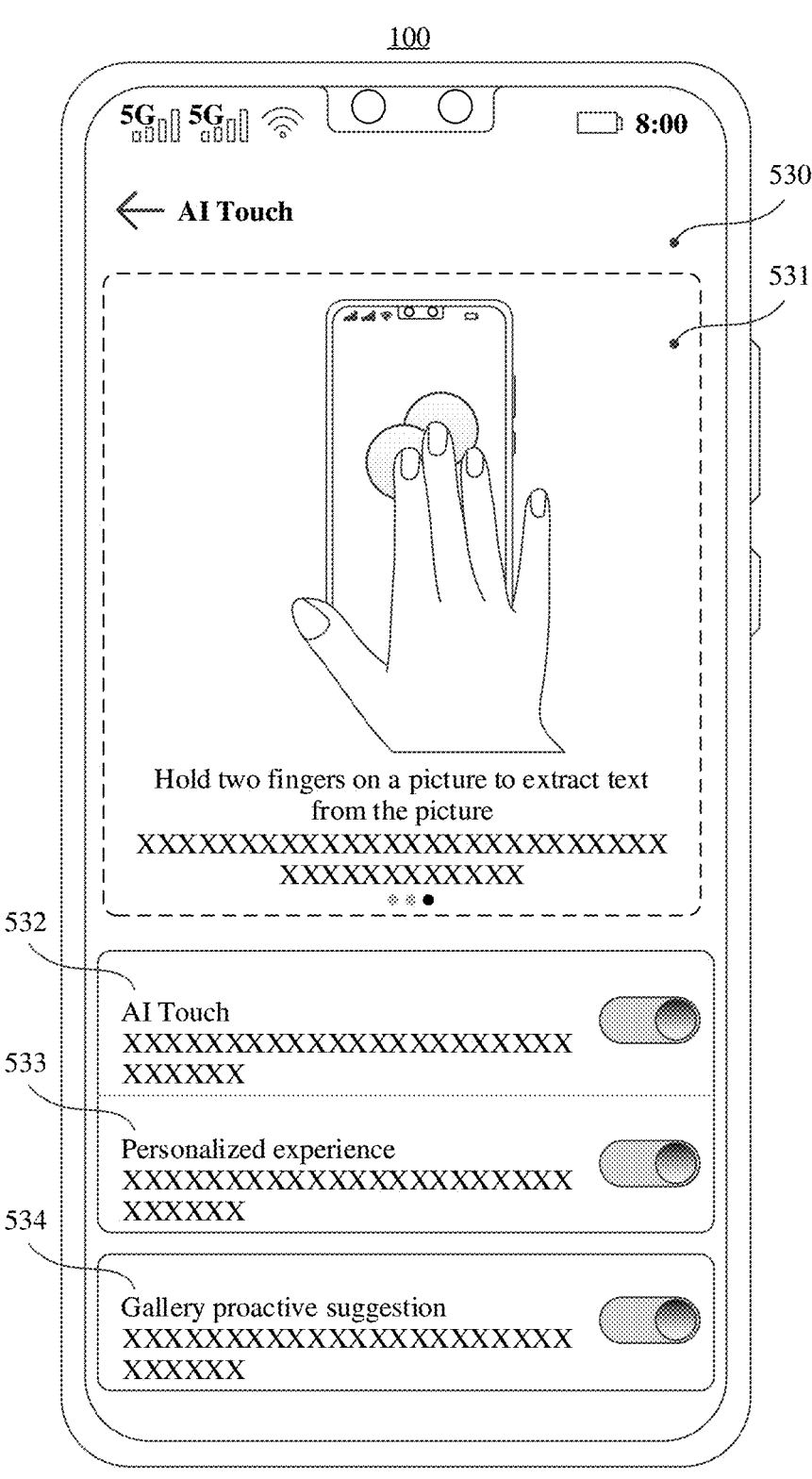

An AI Touch setting interface 530 shown in FIG. 5C may be displayed when an AI Touch option 521 is tapped on the HUAWEI Assistant application interface 520 displayed on the mobile phone 100, as shown in FIG. 5B.

As shown in FIG. 5C, the AI Touch setting interface 530 includes a function introduction region 531. Various function setting buttons are provided below the function introduction region 531, and include an AI Touch switch button 532, a personalized experience switch button 533, a gallery proactive suggestion button 534, and the like. As shown in FIG. 5C, the function introduction region 531 may display a shortcut invoking manner of the intelligent screen identification function. For example, the function introduction region 531 displays an example picture of a shortcut gesture of pressing and holding text or a picture on the screen with two fingers, and displays text introduction such as "Hold two fingers on a picture to extract text from the picture". The user may enable the intelligent screen identification function by tapping the AI Touch switch button 532. After the intelligent screen identification function is enabled, the user may invoke the intelligent screen identification function on an interface of another application by performing an operation of pressing and holding the screen with two fingers. The interface of the another application is the original display interface of the mobile phone 100. It may be understood that, in some embodiments, a desktop of the mobile phone 100 cannot be used as the original display interface.

Figure 5D:
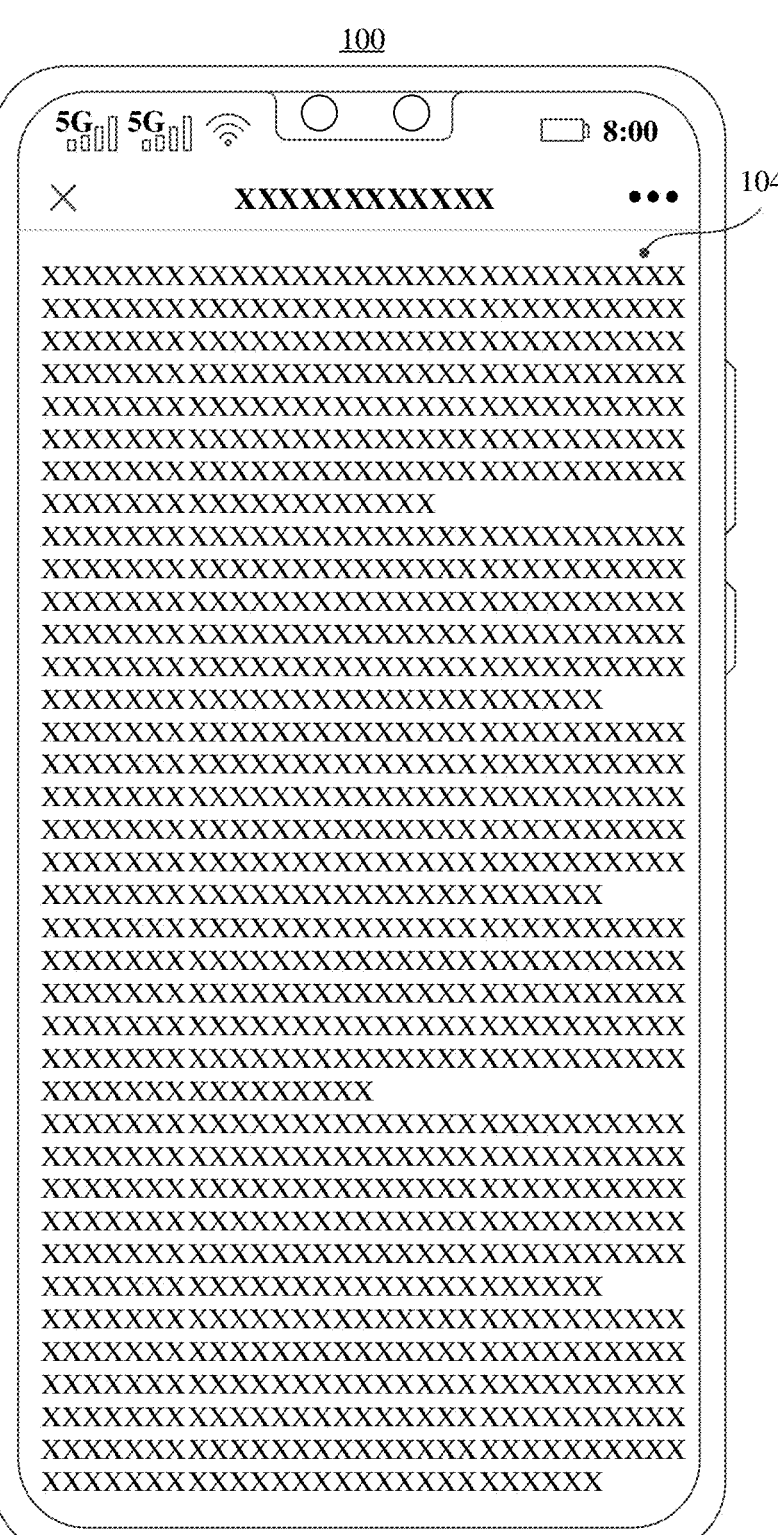
FIG. 5D is a schematic diagram of an interface corresponding to calling an intelligent screen identification function on an interface of another application running on a mobile phone 100 according to an embodiment of this application.

After the intelligent screen identification function of the mobile phone 100 is enabled, still refer to FIG. 5D. After the user operates the mobile phone 100 to open an article pushed by an official account in WeChat™, the mobile phone 100 displays the text browsing interface 104. When the user presses and holds, with two fingers, text on the text browsing interface 104 displayed by the mobile phone 100, the mobile phone 100 may detect the operation performed by the user for opening the dynamic panel (namely, the text identification window 105 shown in FIG. 2A or FIG. 2B). The mobile phone 100 may obtain to-be-displayed content before displaying the corresponding dynamic panel. Then, the following steps 402 to 406 are performed to further determine whether a display mode of the dynamic panel is a quasi-half-screen mode shown in FIG. 2A or a quasi-full-screen mode shown in FIG. 2B.

402: Determine whether the to-be-displayed content of the dynamic panel includes a slide control having a slide conflict. If a determining result is yes, it indicates that the to-be-displayed content may cause misjudgment of a slide operation performed by the user on the dynamic panel. Therefore, step 403 needs to be performed subsequently, to further determine whether the to-be-displayed content causes the misjudgment of the slide operation performed by the user on the dynamic panel. If the determining result is no, it indicates that the to-be-displayed content does not cause the misjudgment of the slide operation performed by the user on the dynamic panel. In this case, step 406 may be performed, to determine the display mode of the dynamic panel as the quasi-half-screen mode.

For example, the processor 110 of the mobile phone 100 may obtain corresponding to-be-displayed content of the dynamic panel in a process in which the window manager is to manage a window to display the dynamic panel, and determine, based on whether the to-be-displayed content has label information and the like corresponding to a slide control in which a slide conflict is nested, whether the to-be-displayed content of the dynamic panel includes the slide control having the slide conflict. For example, because the user generally performs up/down sliding on the dynamic panel of the mobile phone 100 to view more content, if the to-be-displayed content of the dynamic panel includes a control label corresponding to the slide control having the slide conflict, for example, the slide hot spot of the slide control also interacts with the user in response to an up/down slide operation of the user, the mobile phone 100 may determine that the to-be-displayed content of the dynamic panel includes the slide control having the slide conflict.

Figure 6A:
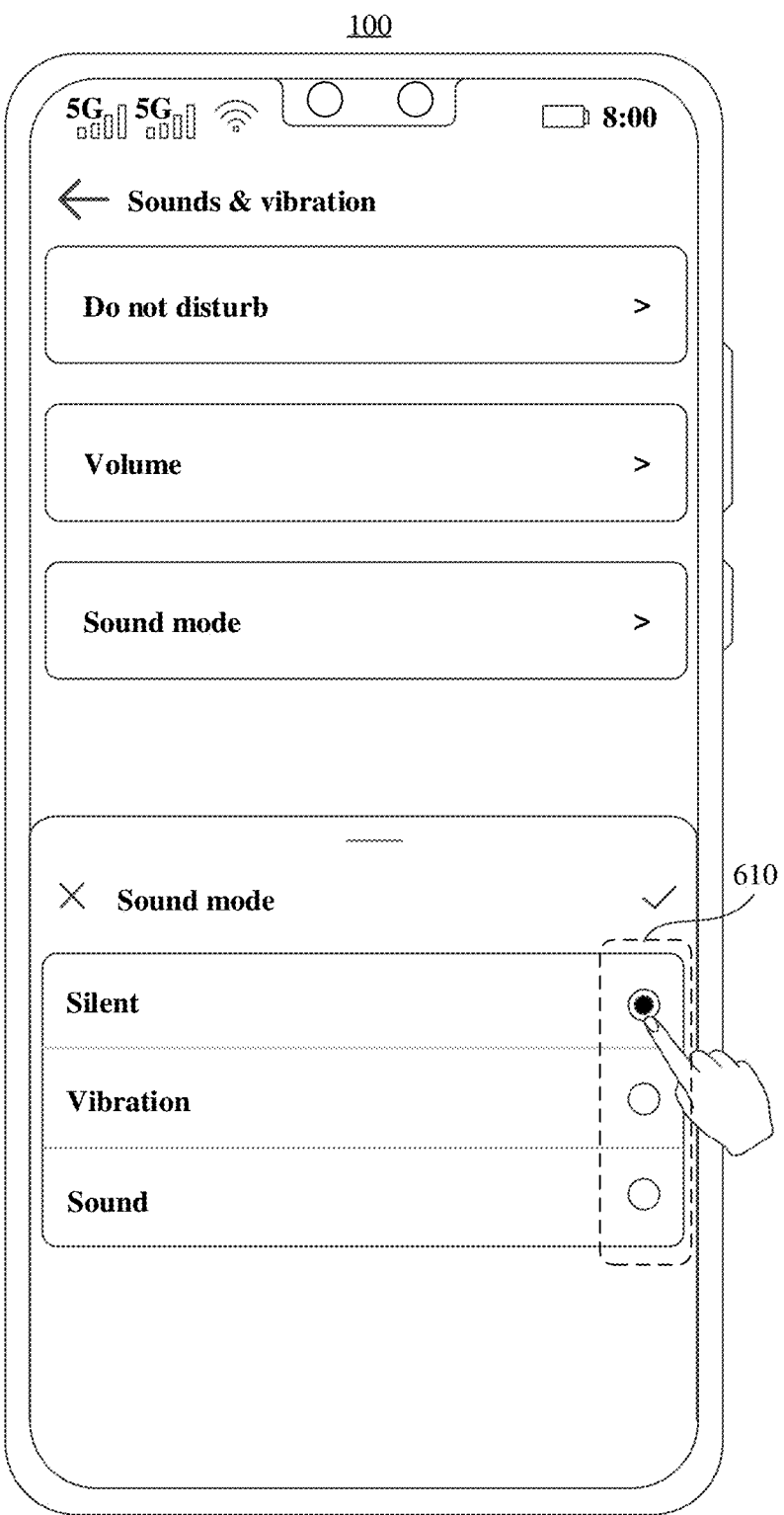
FIG. 6A to FIG. 6D are schematic diagrams of control interfaces displayed on a dynamic panel of a mobile phone 100 according to an embodiment of this application.
Figure 6B:
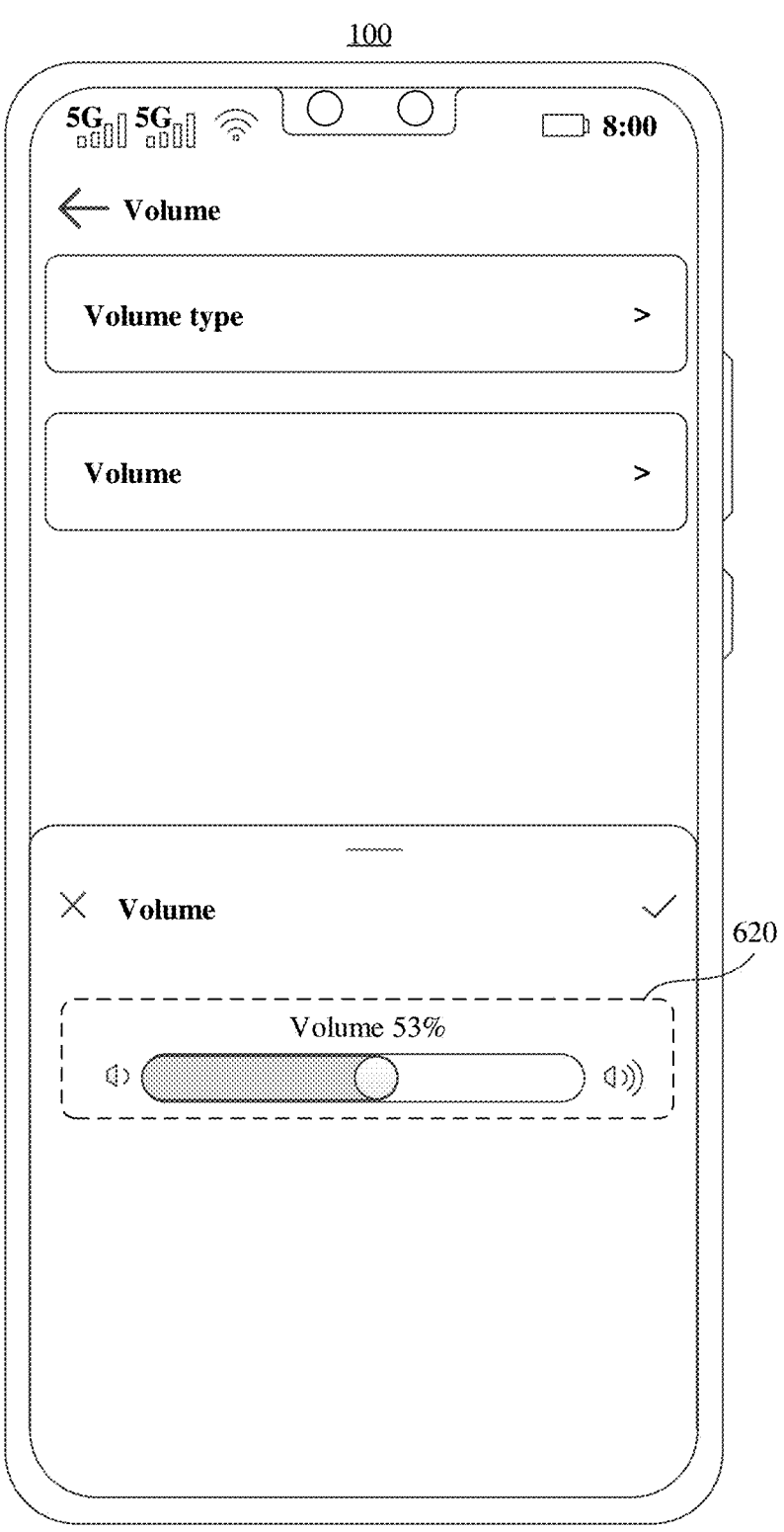
Figure 6C:
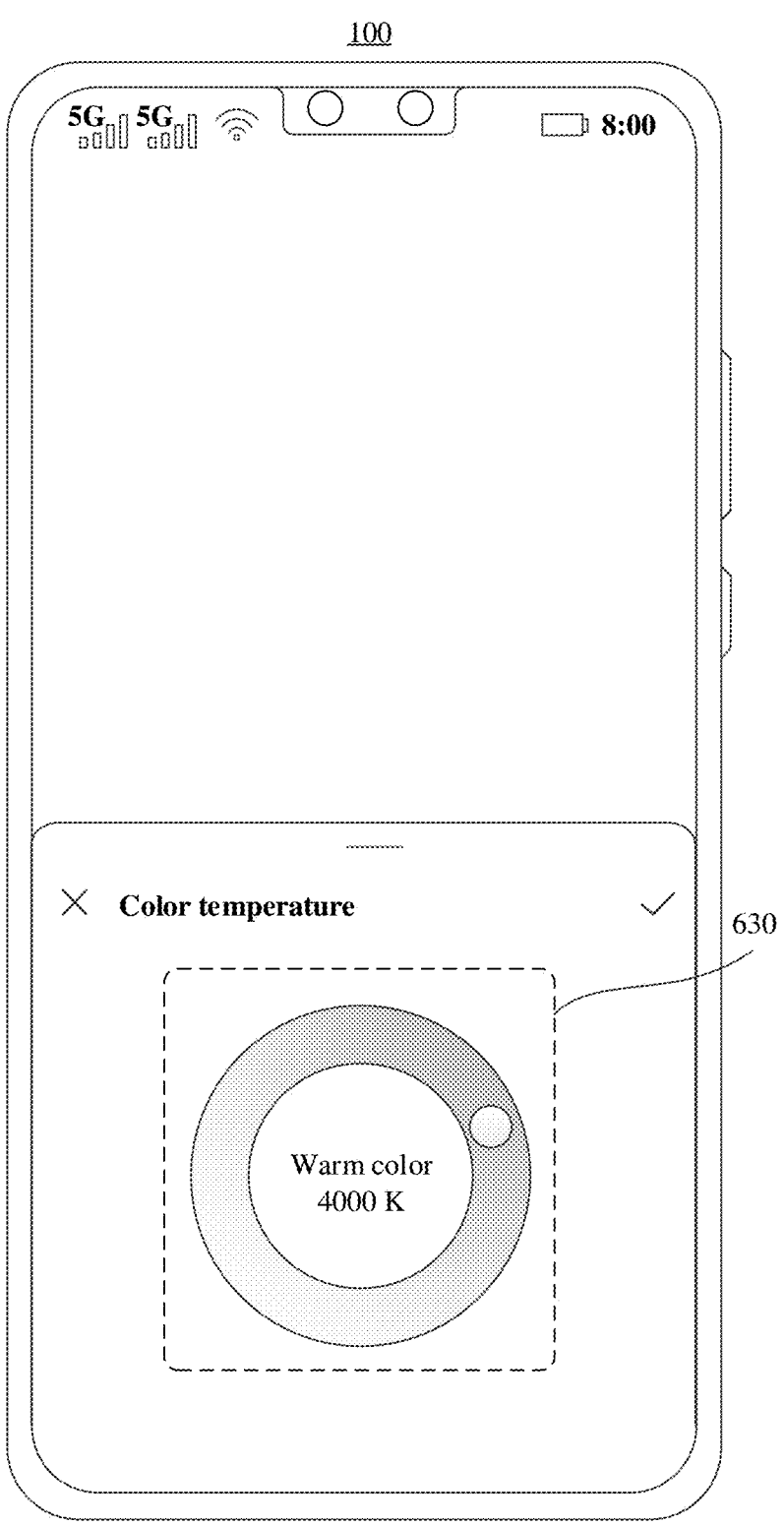

It may be understood that controls displayed on the dynamic panel of the mobile phone 100 may provide a plurality of interaction forms for the user. These controls include but are not limited to a check control 610 shown in FIG. 6A, a left/right slide control 620 shown in FIG. 6B, an annular slide control 630 shown in FIG. 6C, and an up/down slide control 640 shown in FIG. 6D. In some other embodiments, the mobile phone 100 may further display text content through the slide control on which the user performs up/down sliding to view an undisplayed portion, for example, the segmented word display region 106 shown in FIG. 2A or FIG. 2B. When the amount of content of segmented words is relatively large, the user may slide a displayed segmented word in the segmented word display region 106 up and down, to view an undisplayed segmented word. This is not limited herein.

Figure 6D:
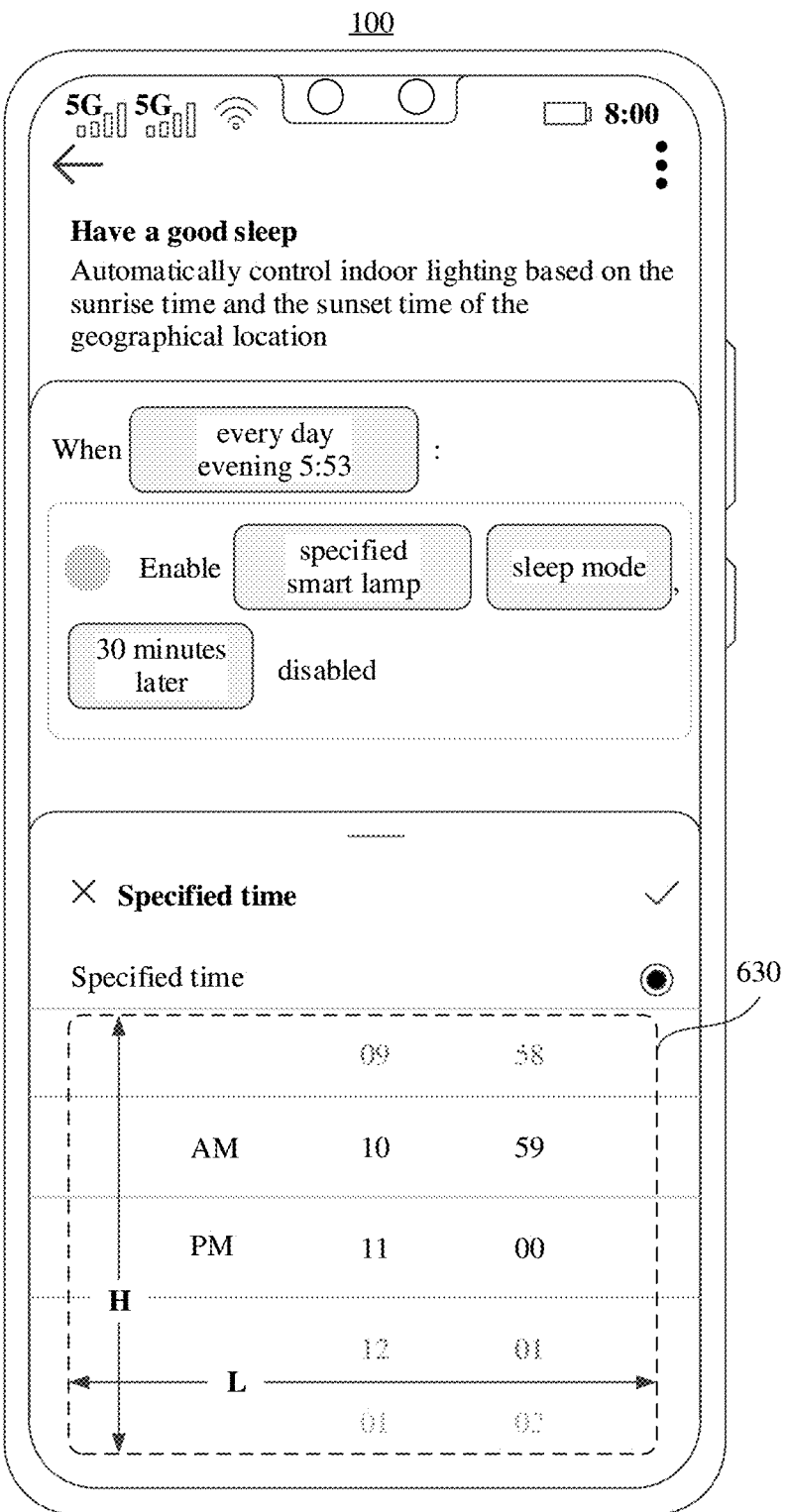

Therefore, it may be understood that, when the to-be-displayed content includes the slide control, for example, the up/down slide control 640 shown in FIG. 6D, and the slide hot spot of the control interacts with the user by responding to the up/down slide operation of the user, the slide hot spot of the up/down slide control 640 overlaps a slide hot spot of the dynamic panel. In addition, the slide hot spot of the up/down slide control 640 is on an upper layer of the slide hot spot of the dynamic panel, and both the slide hot spots interact with the user by responding to the up/down slide operation of the user. In this case, the up/down slide control 640 is the slide control having the slide conflict. At this moment, if the user attempts to perform the up/down slide operation on the dynamic panel within the overlap region, the mobile phone 100 may incorrectly determine an object of the slide operation of the user as the up/down slide control 640. A determining process in the following step 403 needs to be further performed, to further determine whether the up/down slide control 640 causes the misjudgment of the slide operation performed by the user on the dynamic panel.

Figure 7:
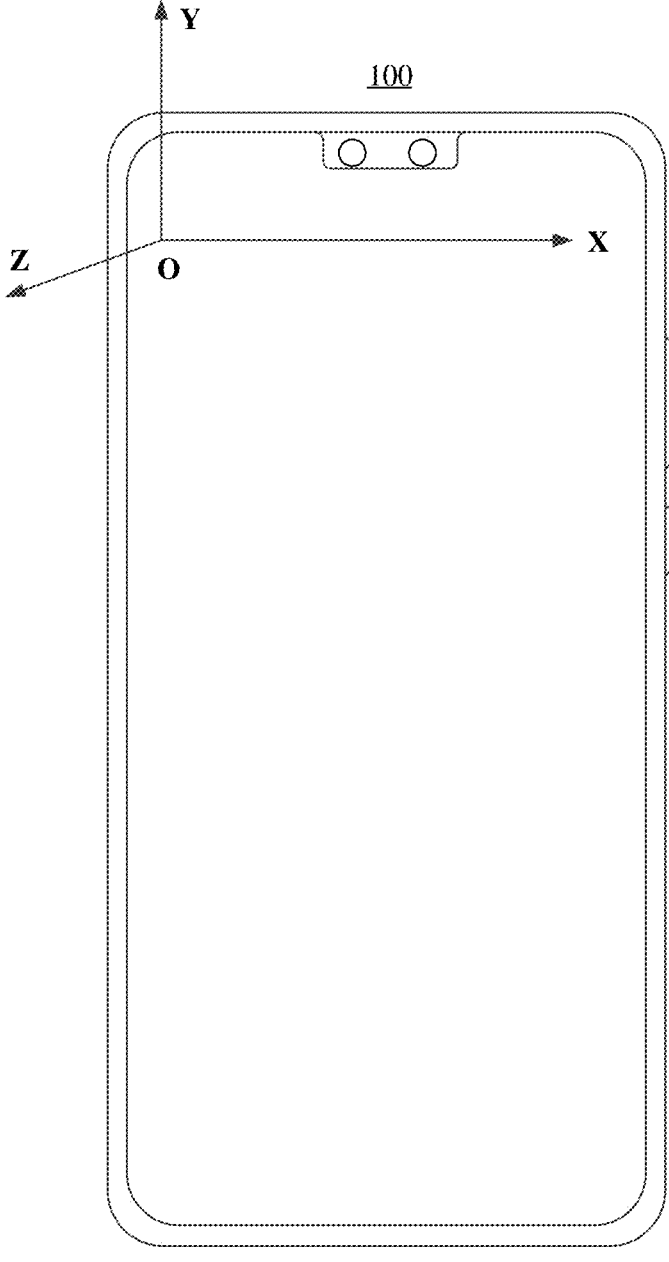
FIG. 7 is a schematic diagram of coordinates used to describe a position relationship between interfaces displayed by a mobile phone 100 according to an embodiment of this application.

For an understanding that the slide hot spot of the up/down slide control 640 is on the upper layer of the slide hot spot of the dynamic panel, refer to a schematic diagram of coordinates shown in FIG. 7. An XOY plane is parallel to a surface of the screen of the mobile phone 100. An X axis is parallel to the upper edge and the lower edge of the screen of the mobile phone 100. A Y axis is parallel to the left edge and the right edge of the screen of the mobile phone 100. A Z axis is a coordinate axis perpendicular to the surface of the screen of the mobile phone 100. In addition, a positive direction of the Z axis is a direction (namely, an OZ direction) in which a point on the screen of the mobile phone 100 points to a point outside the screen. Therefore, it may be understood that, that the slide hot spot of the up/down slide control 640 is on the upper layer of the slide hot spot of the dynamic panel means that the slide hot spot of the up/down slide control 640 is on a plane that extends in the OZ direction from a plane in which the slide hot spot of the dynamic panel is located.

403: Determine whether the size of a slide hot spot of the slide control that is in the to-be-displayed content and that has the slide conflict exceeds a size threshold. If a determining result is yes, it indicates that the to-be-displayed content causes the misjudgment of the slide operation performed by the user on the dynamic panel, and that step 404 needs to be performed subsequently to further determine, based on the length of the to-be-displayed content, a display size that is of the dynamic panel and that is required for displaying the to-be-displayed content. If the determining result is no, it indicates that the to-be-displayed content does not cause the misjudgment of the slide operation performed by the user on the dynamic panel. In this case, step 406 may be performed, to determine the display mode of the dynamic panel as the quasi-half-screen mode.

For example, in the foregoing step 402, the mobile phone 100 determines that the to-be-displayed content of the dynamic panel includes the slide control having the slide conflict. In this case, the processor 110 of the mobile phone 100 may further determine whether the size of the slide hot spot of the slide control having the slide conflict exceeds a preset size threshold. The preset size threshold may be a width threshold in an "L" direction shown in FIG. 6D, for example, set to ⅓ of a display width of the screen of the mobile phone 100, or set to 2 cm. This is not limited herein. In some other embodiments, the preset size threshold may alternatively be a height threshold in an "H" direction shown in FIG. 6D, for example, set to ⅛ of a display height of the screen of the mobile phone 100, or ¼ of a display height of the dynamic panel 102 in the quasi-half-screen mode. This is not limited herein. In some other embodiments, the preset size threshold may alternatively be an area threshold or the like. This is not limited herein.

It may be understood that, if the size of the slide hot spot of the slide control having the slide conflict exceeds the preset size threshold, it indicates that the slide control that is in the to-be-displayed content and that has the slide conflict is large enough to cause the misjudgment of the slide operation performed by the user on the dynamic panel, that is, a probability that the object of the slide operation is incorrectly determined is relatively high. In this case, a size that is of the dynamic panel and that is required for displaying the to-be-displayed content needs to be further determined based on the length of the to-be-displayed content. If the size of the slide control having the slide conflict does not exceed the preset size threshold, it indicates that the slide control that is in the to-be-displayed content and that has the slide conflict is not large enough to cause the misjudgment of the slide operation performed by the user on the dynamic panel, that is, the probability that the object of the slide operation is incorrectly determined is relatively low. In this case, the display mode of the dynamic panel may be determined as the quasi-half-screen mode. Even if the amount of the to-be-displayed content of the dynamic panel is relatively large, the user may perform up/down sliding on the dynamic panel to view content that is not displayed, or slide the dynamic panel upwards to switch the quasi-half-screen mode to the quasi-full-screen mode. Experience of the user is not affected if the operation of the user is smooth.

It may be understood that the preset size threshold may be properly specified based on experience data of the user. For example, the preset size threshold may be determined based on a position and a range of a region that is of the screen of the mobile phone 100 or a displayed dynamic panel and on which the user usually performs a slide operation with a finger. For example, if the finger of the user frequently slides in a region that is on the screen of the mobile phone 100 or the displayed dynamic panel and that is within a range being 1 cm away from the left edge and the right edge of the screen of the mobile phone 100, the preset size threshold (width threshold) may be set to a value that is 2×1 cm smaller than the width of the screen of the mobile phone 100, and is used as a preset width threshold. This is because when a dimension, such as the width, of the slide hot spot of the slide control having the slide conflict is relatively small, and the slide hot spot is not within a frequent slide region of the user, the user may further normally perform the up/down slide operation in the frequent slide region, to adjust a display mode of a panel of the hot spot or to display content that is not displayed. However, if the dimension, such as the width, of the slide hot spot of the slide control having the slide conflict is relatively large, and a degree of overlapping between the slide hot spot and the frequent slide region of the user is relatively high, the mobile phone 100 is prone to incorrectly determine the slide operation performed by the user on the dynamic panel.

404: Determine whether the length of the to-be-displayed content exceeds a preset length threshold. If a determining result is yes, it indicates that the amount of the to-be-displayed content is relatively large. In this case, the dynamic panel that is in the quasi-full-screen mode and that has a relatively large display size is required for displaying; and step 405 needs to be performed, to determine the display mode of the dynamic panel as the quasi-full-screen mode. If the determining result is no, it indicates that the amount of the to-be-displayed content is relatively small, and the dynamic panel in the quasi-half-screen mode can fully display the to-be-displayed content. Therefore, step 406 may be performed, to determine the display mode of the dynamic panel as the quasi-half-screen mode.

For example, after performing the foregoing steps 402 and 403, the processor 110 of the mobile phone 100 determines that the to-be-displayed content includes the slide control having the slide conflict and that the slide hot spot of the slide control causes the misjudgment of the slide operation performed by the user on the dynamic panel, and further determines, based on the length of the obtained to-be-displayed content, a display size that needs to be provided by the dynamic panel, thereby determining the display mode of the dynamic panel. For example, the processor 110 may determine whether the length of the to-be-displayed content of the dynamic panel exceeds the preset length threshold. The length of the to-be-displayed content of the dynamic panel is a length that is required when the mobile phone 100 displays all the to-be-displayed content based on parameters such as a preset font, a picture size, preset typesetting, and the width of the screen of the mobile phone 100. The preset length threshold may be, for example, an upper limit of the display height of the dynamic panel in the quasi-half-screen mode, or may be another properly specified threshold. This is not limited herein.

When the length of the to-be-displayed content of the dynamic panel exceeds the preset length threshold, it indicates that if the mobile phone 100 displays the dynamic panel in the quasi-half-screen mode in this case, the to-be-displayed content cannot be completely displayed, that is, some of the to-be-displayed content is hidden and not displayed. Consequently, the content that is not displayed may be ignored or not viewed by the user. Therefore, if the mobile phone 100 determines that the length of the to-be-displayed content of the dynamic panel exceeds the preset length threshold, the mobile phone 100 may determine the display mode of the dynamic panel as the quasi-full-screen mode, that is, perform the following step 405. If the mobile phone 100 determines that the length of the to-be-displayed content of the dynamic panel does not exceed the preset length threshold, the mobile phone 100 may determine the display mode of the dynamic panel as the quasi-half-screen mode, that is, perform the following step 406.

405: Determine a display mode of the dynamic panel as a quasi-full-screen mode.

For example, in a case that the processor 110 of the mobile phone 100 determines, after performing the determining in the foregoing steps 402 to 404, that the to-be-displayed content of the dynamic panel includes the slide control having the slide conflict, that the size of the slide hot spot of the slide control exceeds the preset size threshold, and that the length of the to-be-displayed content of the dynamic panel exceeds the preset length threshold, the processor 110 of the mobile phone 100 may determine the display mode of the dynamic panel as the quasi-full-screen mode, so that the to-be-displayed content is displayed as completely as possible by using the dynamic panel in the quasi-full-screen mode, to prevent undisplayed content from being missed by the user.

It may be understood that the length of the to-be-displayed content of the dynamic panel may also exceed an upper limit of a display height of the dynamic panel in the quasi-full-screen mode. However, the display height of the dynamic panel in the quasi-full-screen mode is greater than that of the dynamic panel in the quasi-half-screen mode, and a ratio of the two display heights is generally about 2:1. Therefore, the dynamic panel in the quasi-full-screen mode can display more content, and provide a larger slide hot spot for the user to perform a slide operation. In this case, even if the slide control having the slide conflict exists in the to-be-displayed content, when the user performs an up/down slide operation, a probability that a finger slides in a slide hot spot having the slide conflict is relatively low.

Refer to FIG. 2B. When the quantity of segmented words in the segmented word display region 106 is relatively large, and the text identification interface 105 displayed by the mobile phone 100 is in the quasi-full-screen mode, all segmented words that are in the segmented word display region 106, and a search button 108, a copy button 109, a translation button in, a share button 112, and a recommended readings region 107 that are below the segmented word display region 106 may be completely displayed. However, if to-be-displayed content of the text identification interface 105 shown in FIG. 2B is displayed by using the interface shown in FIG. 2A, the to-be-displayed content may not be completely displayed, and a slide conflict affecting experience of the user may occur.

406: Determine a display mode of the dynamic panel as a quasi-half-screen mode.

For example, in a case that the processor 110 of the mobile phone 100 determines, after performing the determining in the foregoing steps 402 to 404, that the to-be-displayed content of the dynamic panel does not include the slide control having the slide conflict, or that the size of the slide hot spot of the slide control having the slide conflict and existing in the to-be-displayed content of the dynamic panel does not exceed the preset size threshold, or the length of the to-be-displayed content of the dynamic panel does not exceed the preset length threshold, or the like, the processor 110 may determine the display mode of the dynamic panel as the quasi-half-screen mode. In this way, blocking of the original display interface by the dynamic panel can be reduced, so that the user can browse, at the same time, content of the original display interface and content displayed on the dynamic panel.

Refer to the scene shown in FIG. 2A. If the user selects a relatively small amount of text by performing an operation ① on the text browsing interface 104 displayed by the mobile phone 100, and the quantity of to-be-displayed segmented words obtained through identification is also relatively small, the display mode of the text identification window 105 displayed by the mobile phone 100 is the quasi-half-screen mode. In this way, the portion that is not blocked by the text identification window 105 and that is of the text browsing interface 104 displayed by the mobile phone 100 can still be viewed by the user. In other words, in this case, the mobile phone 100 does not need to display the text identification window 105 by using the dynamic panel in the quasi-full-screen mode. In this scene, the mobile phone 100 displays the text identification window 105 by using the dynamic panel in the quasi-half-screen mode by default, so that more content on the text browsing interface 104 can be displayed for the user, and visual disturbance caused by blocking of the dynamic panel to the user can be reduced.

It may be understood that, in some other embodiments, after the foregoing step 403, the mobile phone 100 may further determine whether the slide control having the slide conflict and included in the to-be-displayed content of the dynamic panel is an endless slide control or an ultra-long slide control. If yes, the mobile phone 100 may further determine that the slide control having the conflict causes the mobile phone 100 to incorrectly determine the object of the slide operation of the user. Then, the mobile phone 100 further performs the foregoing step 404, to further determine, based on the length of the to-be-displayed content, a display size that is of the dynamic panel and that is required for displaying the to-be-displayed content. If not, it indicates that when the mobile phone incorrectly determines the object of the slide operation of the user, the user may further implement an effective slide operation on the dynamic panel after a few slide operations of a limited quantity are performed on the slide control having the slide conflict. In this case, an impact on experience of the user is relatively small; and step 406 may be performed, to determine the display mode of the dynamic panel as the quasi-half-screen mode. This is not limited herein.

The user may perform the up/down slide operation for an infinite quantity of times on a slide hot spot provided by the endless slide control. If the mobile phone 100 incorrectly determines, as a slide operation on the endless slide control, the slide operation performed by the user on the dynamic panel, the slide operation performed by the user is an ineffective slide operation on the dynamic panel, causing poor experience of the user. For example, when the user performs down sliding on the slide hot spot provided by the endless slide control to switch a to-be-selected parameter, after the last to-be-selected parameter is displayed on the endless slide control, the first to-be-selected parameter to the last to-be-selected parameter are displayed again sequentially, and the process is cycled continuously. In other words, the user may endlessly slide down the control used for switching the to-be-selected parameter. However, on a slide hot spot provided by the ultra-long slide control, although the user may continue to perform effective up/down sliding on the dynamic panel after performing the up/down slide operations for a limited quantity of times, it takes a long time for the user to perform the slide operations for the limited quantity of times on the slide hot spot provided by the ultra-long slide control. This also worsens experience of the user.

Therefore, it may be understood that, according to the display method of this application, the display mode of the dynamic panel may be properly determined based on the to-be-displayed content. When it is improper to display the to-be-displayed content by using the dynamic panel in the quasi-half-screen mode, an electronic device such as the mobile phone 100 may display the to-be-displayed content by using the dynamic panel in the quasi-full-screen mode by default. In addition, according to the display method of this application, the to-be-displayed content is displayed by using the dynamic panel in the quasi-full-screen mode only when displaying the to-be-displayed content by using the dynamic panel in the quasi-half-screen mode causes poor experience of the user. Therefore, the following problem is avoided: The mobile phone 100 frequently uses the dynamic panel in the quasi-full-screen mode to display the to-be-displayed content, making an original display interface completely covered, and causing visual disturbance to the user. This improves experience of the user.

With reference to another scene and the specific implementation process that is of the display method of this application and that is described in the foregoing steps 401 to 406, a technical effect that can be presented by the display method of this application is further described below.

FIG. 8A to FIG. 8H are schematic diagrams of process interfaces in which the mobile phone 100 displays to-be-set items on the original display interface by using the dynamic panel when the user uses an AI Life application on the mobile phone 100.

Figure 8A:
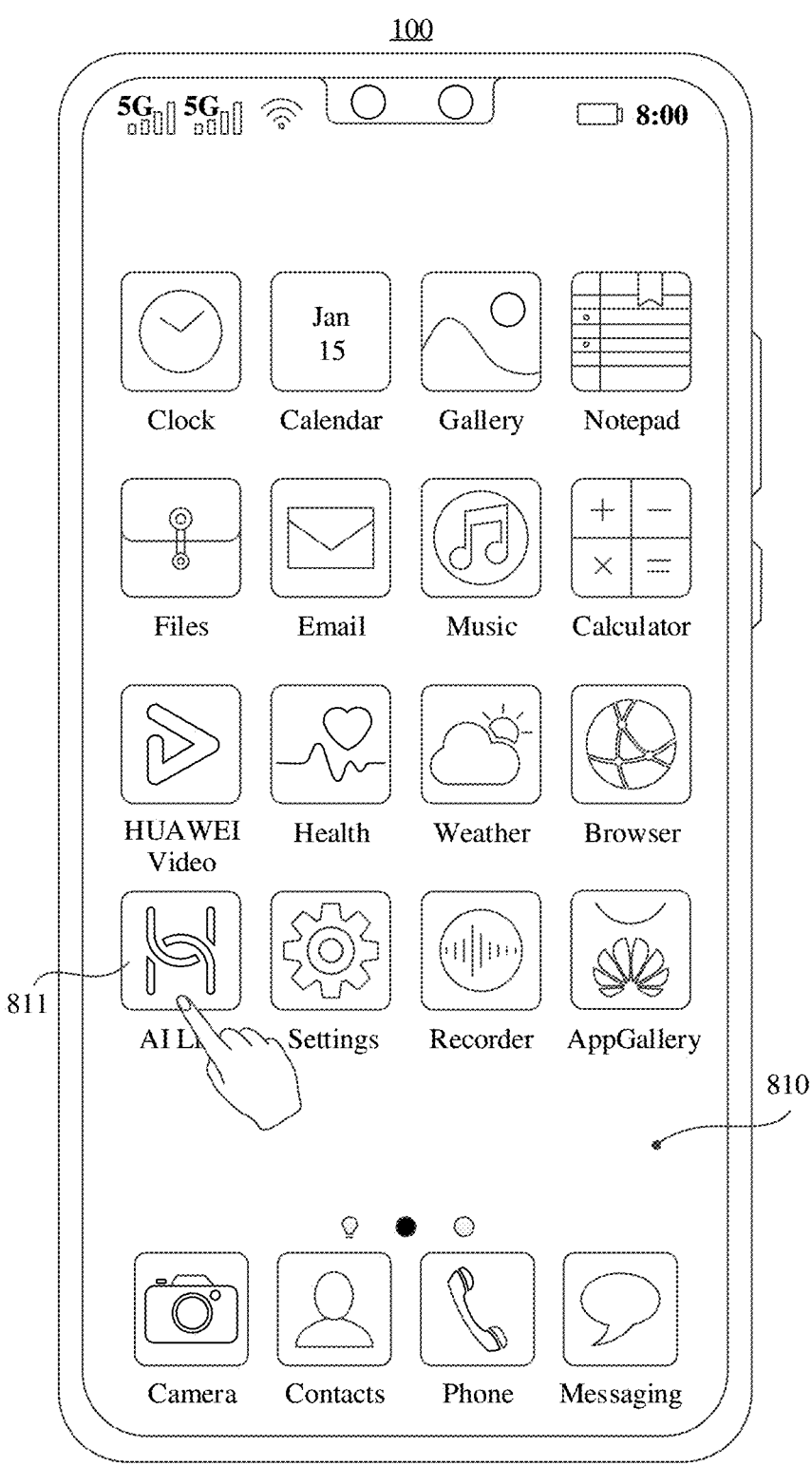
FIG. 8A to FIG. 8H are schematic diagrams of process interfaces in which a mobile phone 100 displays to-be-set items on an original display interface by using a dynamic panel when a user uses an AI Life application on a mobile phone 100 according to an embodiment of this application.

As shown in FIG. 8A, the user taps the AI Life application 811 on a desktop 810 of the mobile phone 100. The mobile phone 100 runs the AI Life application 811, and opens an AI Life application interface 820 shown in FIG. 8B.

Figure 8B:
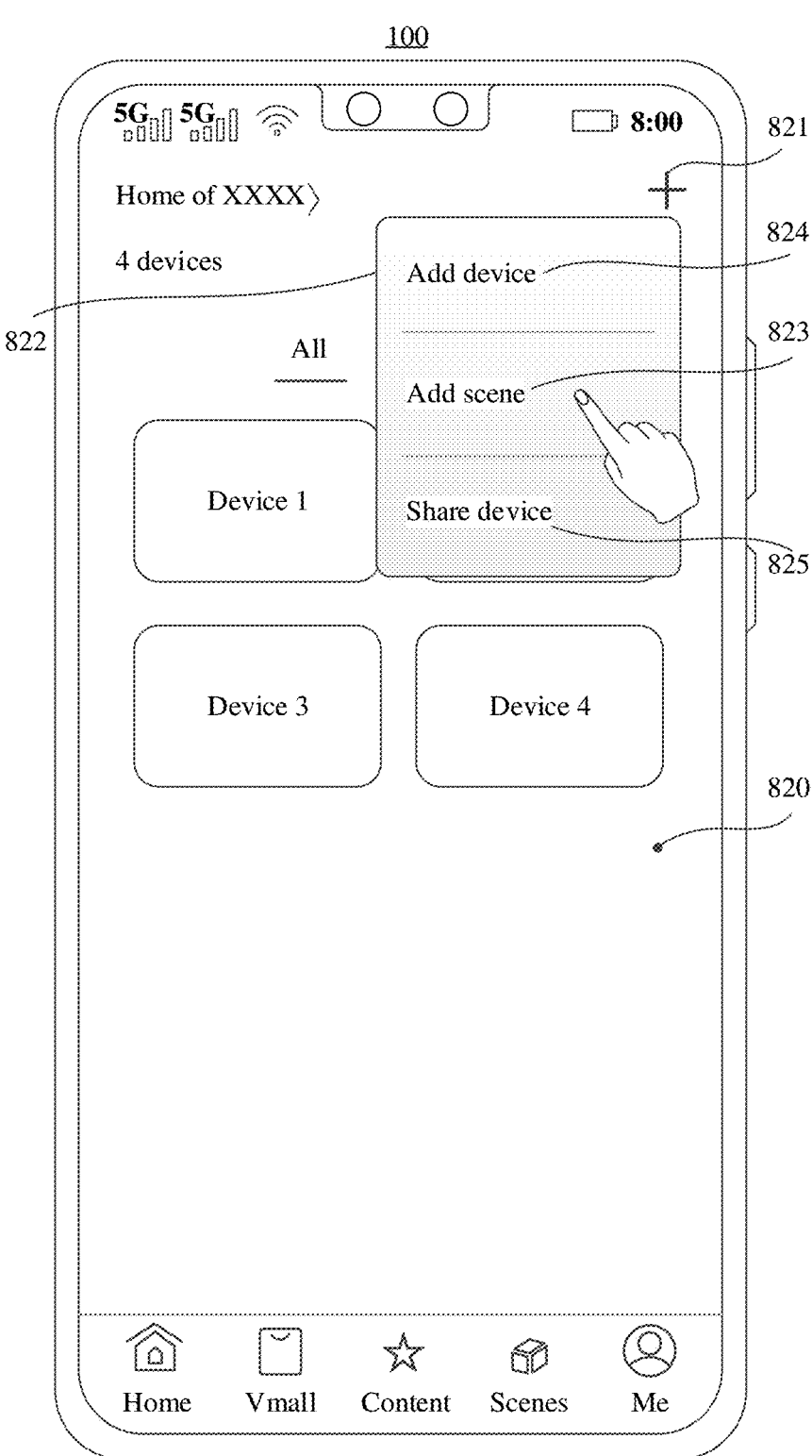

As shown in FIG. 8B, the user taps an add button 821 in an upper right corner of the AI Life application interface 820 displayed on the mobile phone 100, to invoke an add operation window 822. The user taps a scene create option 823 in the add operation window 822 to create an AI scene. In response to the operation of the user, the mobile phone 100 opens a scene create interface 830 shown in FIG. 8C. In addition, in the add operation window 822, a device add option 824 may be configured to add a smart device to the AI Life application 811 for management; and a device share option 825 may be configured to share, with another electronic device such as a mobile phone for use, a smart device (for example, a device 1, a device 2, a device 3, or a device 4 shown in FIG. 8B) managed by the AI Life application 811. Details are not described herein again.

Figure 8C:
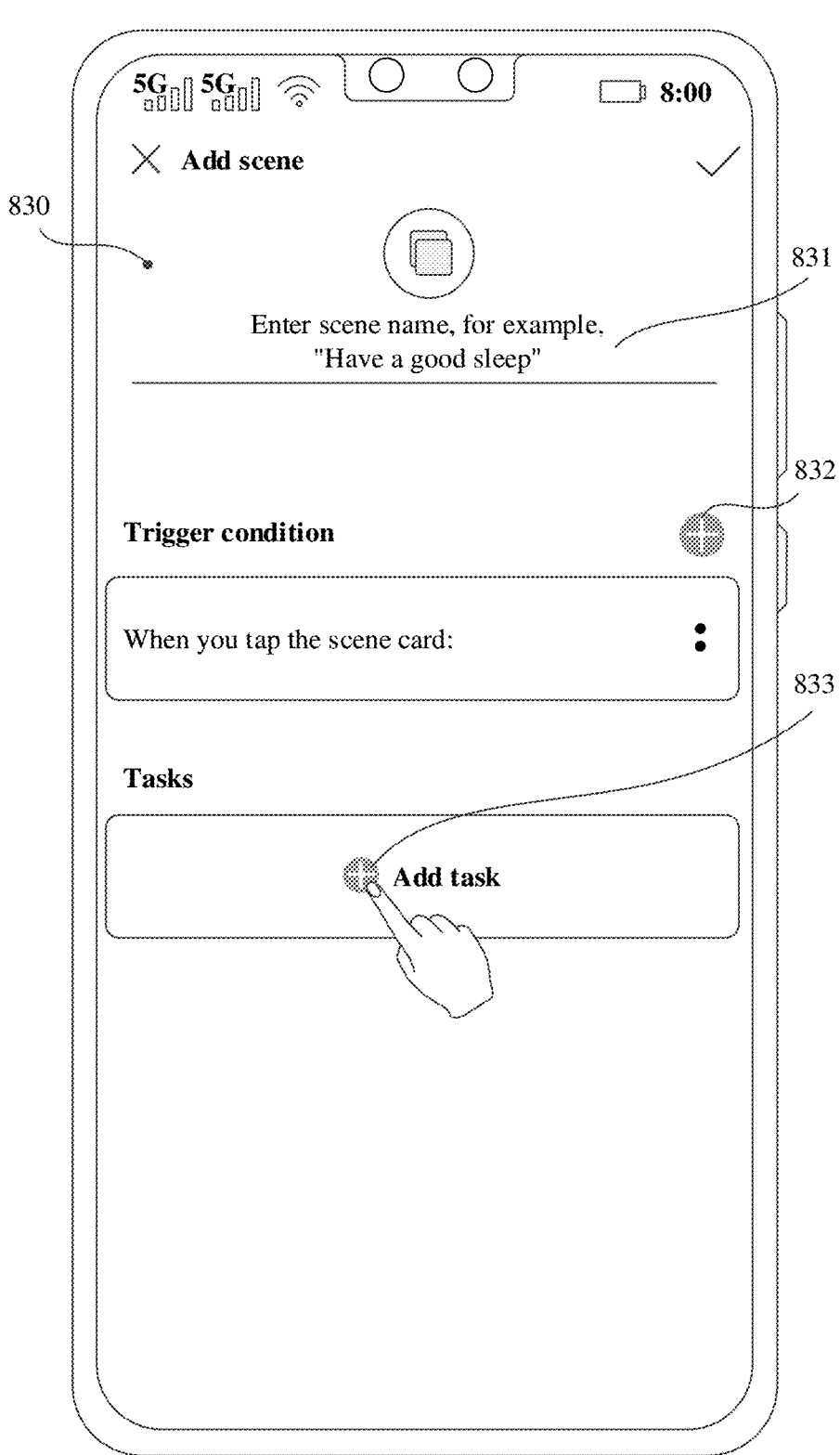
Figure 8D:
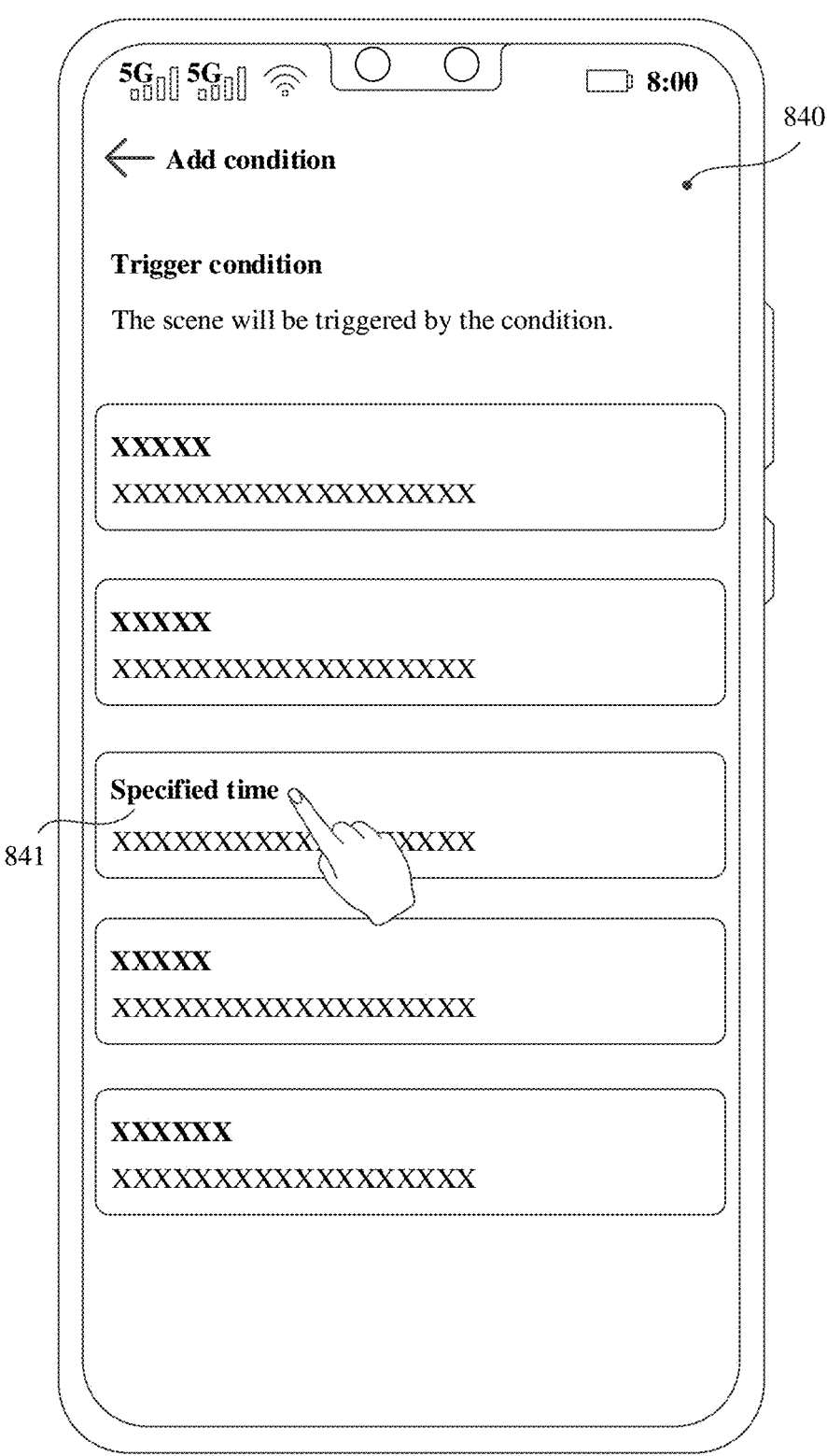

As shown in FIG. 8C, on the scene create interface 830 displayed by the mobile phone 100, the user may set a name of a to-be-created scene in a scene name setting box 831, for example, set the scene name to "Have a good sleep"; may tap a trigger condition add button 832 on the scene create interface 830, to set a trigger condition for a created scene card and to enter an add condition setting interface 840 shown in FIG. 8D; and may tap a task add button 833 under a task execution option on the scene create interface 830, to add a to-be-executed task, for example, weather broadcast or schedule broadcast. Details are not described herein.

Figure 8E:
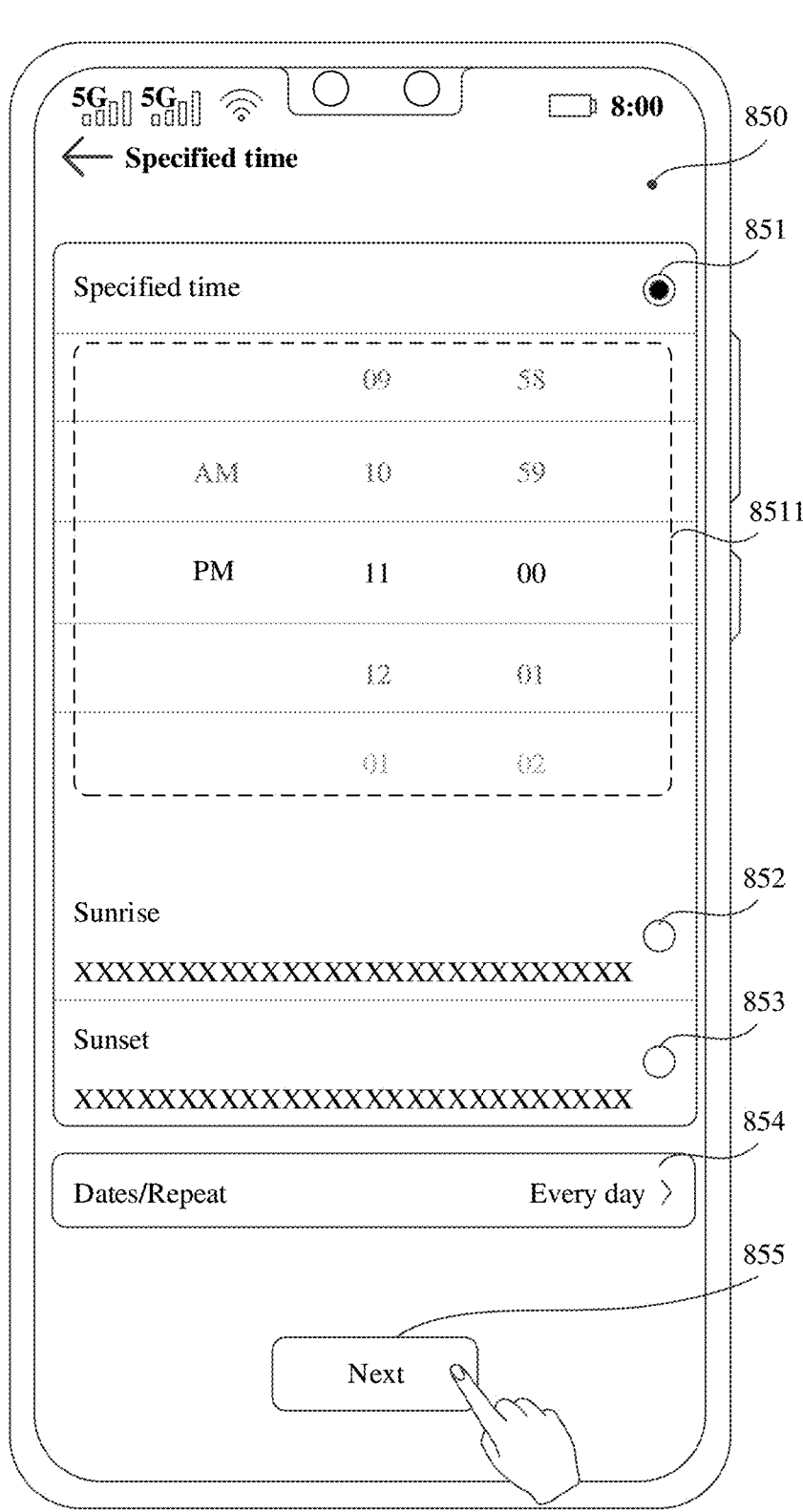

As shown in FIG. 8D, the user may select a "Specify time" option 841 on the add condition setting interface 840 displayed by the mobile phone 100, to enter a specified time setting interface 850 shown in FIG. 8E.

As shown in FIG. 8E, the user may perform an up/down slide operation in a slide hot spot 8511 under a specified time check box 851 on the specified time setting interface 850 displayed by the mobile phone 100, to set a specified time, for example, set the specified time to "11:00 p.m.". Alternatively, the user may tap a sunrise check box 852 on the specified time setting interface 850 to set the specified time to a sunrise time, or tap a sunset check box 853 to set the specified time to a sunset time. In addition, the user may tap a date and repetition option 854 on the specified time setting interface 850, to set a task repeat cycle to daily repetition, weekly repetition, legal workday repetition, or the like. After the setting is completed, the user may tap a next button 855 on the specified time setting interface 850, to enter a "Have a good sleep" scene interface 860 shown in FIG. 8F.

Figure 8F:
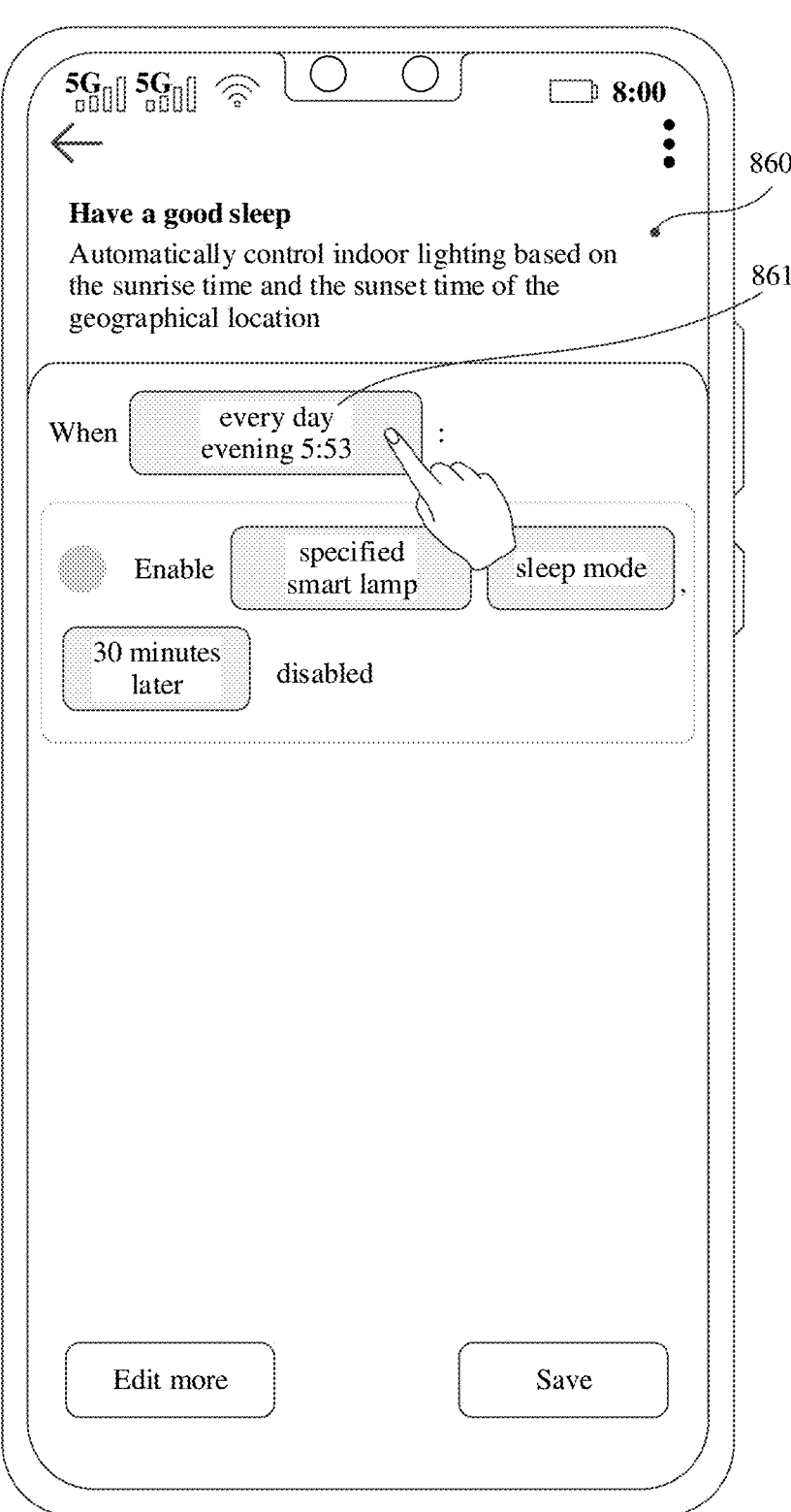

As shown in FIG. 8F, an operation of tapping a time control 861 by the user on the "Have a good sleep" scene interface 860 is the "operation performed by the user for opening the dynamic panel on the original display interface" described in the foregoing step 401. The determining process of the foregoing steps 402 to 404 needs to be performed when the mobile phone 100 detects the operation of tapping the time control 861 by the user. In a case that the mobile phone 100 determines that to-be-displayed content of a dynamic panel corresponding to the time control 861 includes a slide control (namely, the foregoing specified time check box 851) having a slide conflict, that the width of a slide hot spot of the slide control having the slide conflict exceeds a preset ⅔ screen width value, and that the length of the to-be-displayed content of the dynamic panel corresponding to the time control 861 exceeds the preset length threshold, the mobile phone 100 displays a specified time setting panel 870 shown in FIG. 8G in the quasi-full-screen mode by default.

Figure 8G:
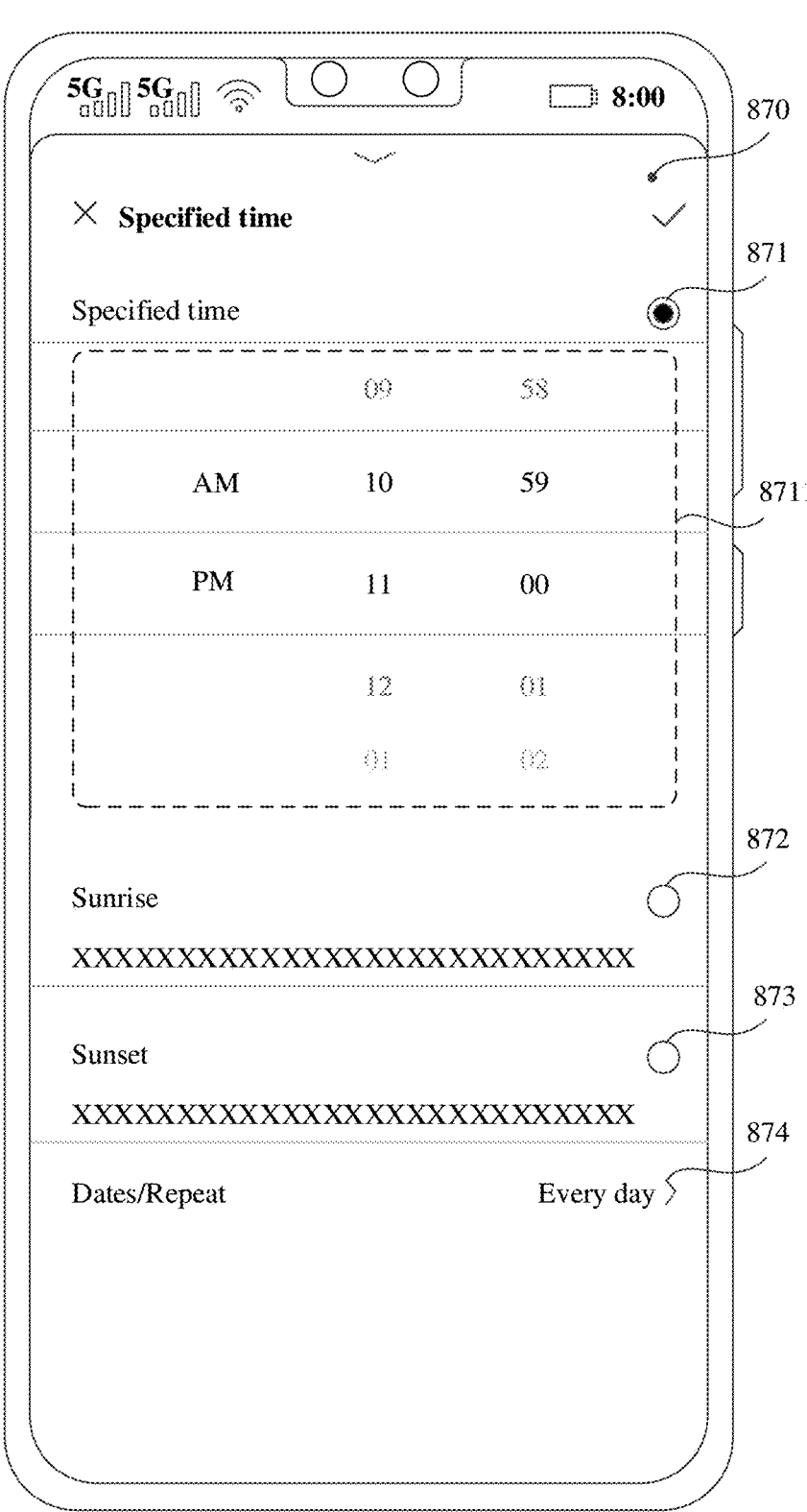

As shown in FIG. 8G, the specified time setting panel 870 includes a specified time check box 871 and a slide hot spot 8711 below the specified time check box 871. The user may perform a slide operation on the slide hot spot 8711 to set a specified time. The specified time setting panel 870 further includes a sunrise check box 872, a sunset check box 873, and a date and repetition option 874. It can be learned from FIG. 8G that, the specified time setting panel 870 displayed in the quasi-full-screen mode by default can fully display options that need to be set by the user, so that the user is not prone to miss any setting.

It may be understood that, if the mobile phone 100 determines, without using the display method of this application, a display mode that needs to be used by a dynamic panel to be displayed by the mobile phone 100 in response to the operation of tapping the time control 861 by the user, when the mobile phone 100 detects the operation of tapping the time control 861 by the user, the specified time setting panel 870 may be displayed in the quasi-half-screen mode by default. Refer to the specified time setting panel 870' displayed on an interface shown in FIG. 8H.

Figure 8H:
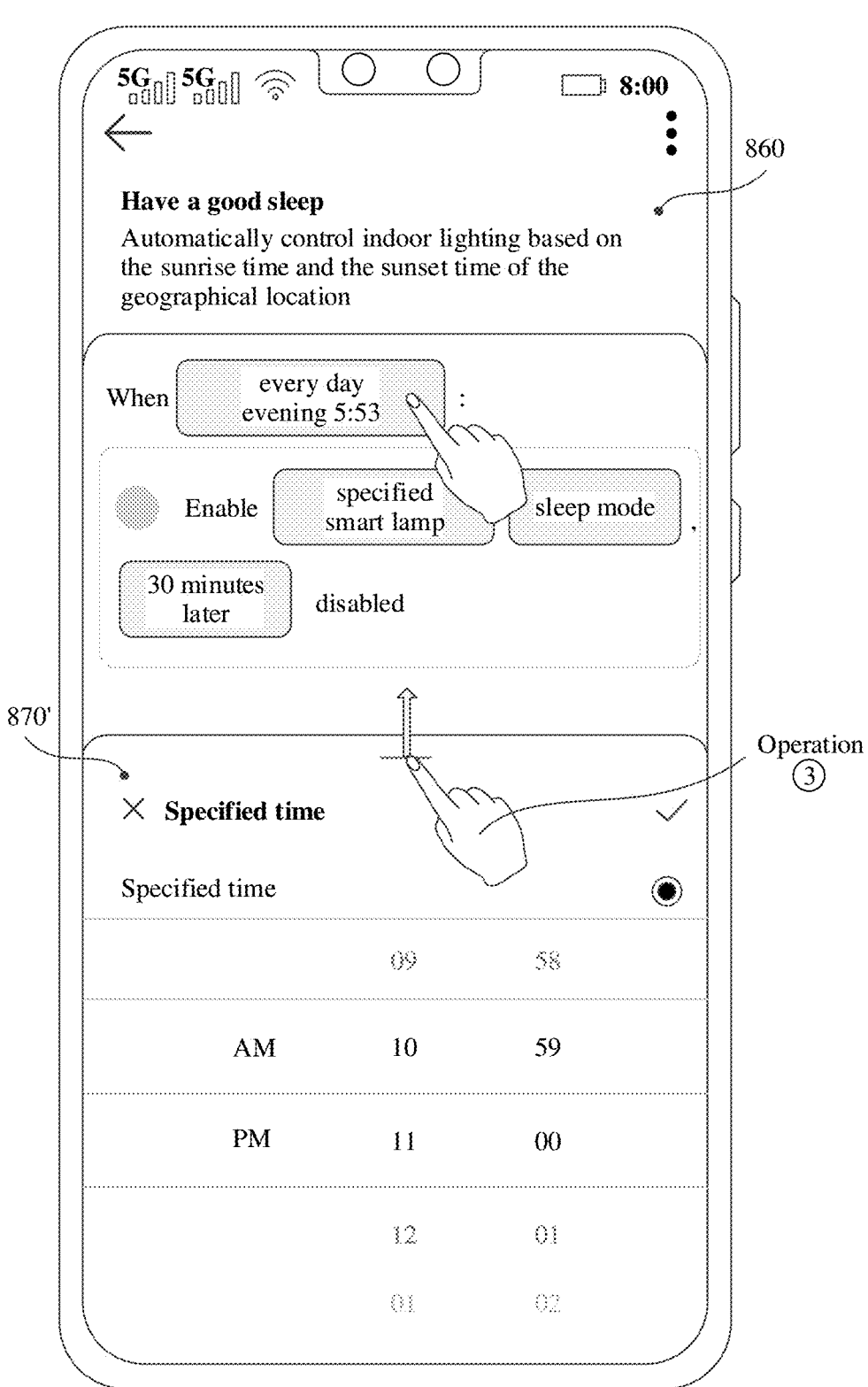

It can be learned via comparison between the interfaces shown in FIG. 8G and FIG. 8H that no sunrise option, no sunset option, and no date and repetition option are displayed on the specified time setting panel 870' shown in FIG. 8H. Therefore, the specified time setting panel 870' shown in FIG. 8H may cause the user to miss setting of another related option, for example, miss setting of the date and repetition option. In addition, if the user intends to switch to a display mode corresponding to the specified time setting panel 870 shown in FIG. 8G by performing an up slide operation (refer to an operation ③ shown in FIG. 8H) on the specified time setting panel 870' shown in FIG. 8H, the mobile phone 100 may incorrectly determine the up slide operation of the user as an up/down slide operation on the slide hot spot 8711 below the time check box 871, resulting in poor experience of the user.

It may be understood that, in some other embodiments, implementation of the display method that is provided in this application and by which a display mode of a dynamic panel can be adjusted dynamically may also be performed according to another implementation process. This is not limited herein.

Figure 9:
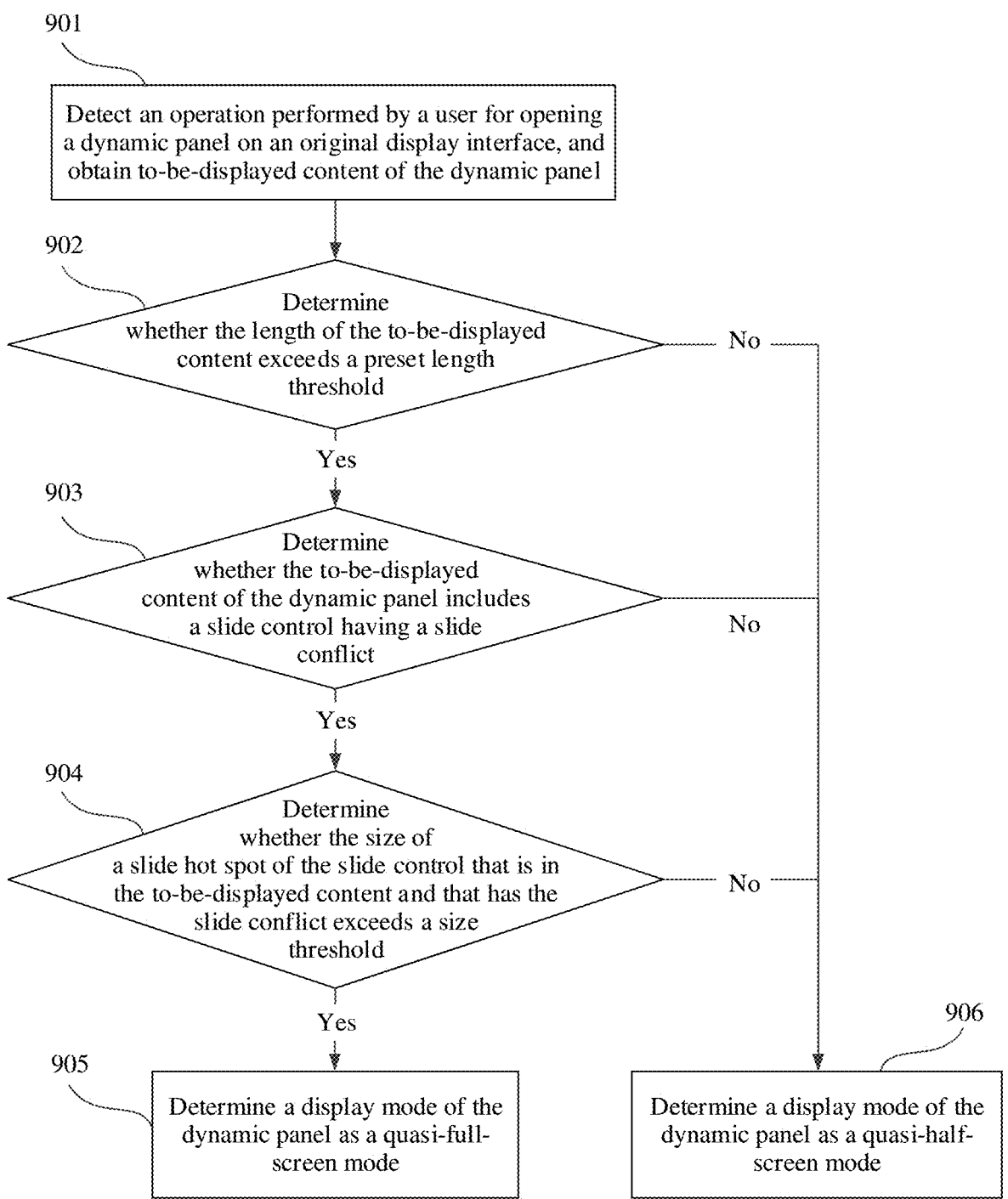
FIG. 9 is a schematic diagram of another specific process for implementing a display method of this application by a mobile phone 100 according to an embodiment of this application.

In an example, FIG. 9 is a schematic diagram of another specific process for implementing the display method of this application by the mobile phone 100, and differs from the schematic diagram of the process shown in FIG. 4 in an execution sequence of some steps. In other words, whether the length of the to-be-displayed content of the dynamic panel exceeds the preset length threshold is determined earlier in FIG. 9. If the length exceeds the preset length threshold, it indicates that the amount of the to-be-displayed content is relatively large, and the dynamic panel in the quasi-full-screen mode may be required for displaying. In this case, whether the to-be-displayed content includes the slide control having the slide conflict and whether the size of the slide hot spot of the slide control having the slide conflict exceeds a threshold are further determined, to determine whether the display mode of the dynamic panel uses the quasi-full-screen mode or the quasi-half-screen mode.

Specifically, as shown in FIG. 9, the process is executed by the mobile phone 100, and includes the following steps:

901: Detect an operation performed by a user for opening a dynamic panel on an original display interface, and obtain to-be-displayed content of the dynamic panel.

Specifically, for the operation performed by the user for opening the dynamic panel and a process in which the mobile phone 100 obtains the to-be-displayed content, refer to related descriptions in the foregoing step 401. Details are not described herein again.

902: Determine whether the length of the to-be-displayed content exceeds a preset length threshold. If a determining result is yes, it indicates that the amount of the to-be-displayed content is relatively large. In this case, the dynamic panel that is in the quasi-full-screen mode and that has a relatively large display size may be required for displaying; and step 903 needs to be performed, to further determine the display mode of the dynamic panel. If the determining result is no, it indicates that the amount of the to-be-displayed content is relatively small, and the dynamic panel in the quasi-half-screen mode can fully display the to-be-displayed content. Therefore, step 906 may be performed, to determine the display mode of the dynamic panel as the quasi-half-screen mode.

Specifically, for a process in which the processor 110 of the mobile phone 100 determines whether the length of the to-be-displayed content exceeds the preset length threshold, refer to a related description in the foregoing step 404. Details are not described herein again.

903: Determine whether the to-be-displayed content of the dynamic panel includes a slide control having a slide conflict. If a determining result is yes, it indicates that the to-be-displayed content may cause misjudgment of a slide operation performed by the user on the dynamic panel. Therefore, step 904 needs to be performed subsequently, to further determine whether the to-be-displayed content causes the misjudgment of the slide operation performed by the user on the dynamic panel. If the determining result is no, it indicates that the to-be-displayed content does not cause the misjudgment of the slide operation performed by the user on the dynamic panel. In this case, step 906 may be performed, to determine the display mode of the dynamic panel as the quasi-half-screen mode.

Specifically, for a process of in which the processor 110 of the mobile phone 100 determines whether the to-be-displayed content of the dynamic panel includes the slide control having the slide conflict, refer to a related description in the foregoing step 402. Details are not described herein again.

904: Determine whether the size of a slide hot spot of the slide control that is in the to-be-displayed content and that has the slide conflict exceeds a size threshold. If a determining result is yes, it indicates that the to-be-displayed content causes the misjudgment of the slide operation performed by the user on the dynamic panel. Therefore, step 905 needs to be performed subsequently, to determine the display mode of the dynamic panel as the quasi-full-screen mode. If the determining result is no, it indicates that the to-be-displayed content does not cause the misjudgment of the slide operation performed by the user on the dynamic panel. In this case, step 406 may be performed, to determine the display mode of the dynamic panel as the quasi-half-screen mode.

Specifically, for a process in which the processor 110 of the mobile phone 100 determines whether the size of the slide hot spot of the slide control having the slide conflict exceeds the size threshold, refer to a related description in the foregoing step 403. Details are not described herein again.

905: Determine a display mode of the dynamic panel as a quasi-full-screen mode.

Specifically, for a process in which the processor 110 of the mobile phone 100 determines the display mode of the dynamic panel as the quasi-full-screen mode, refer to a related description in the foregoing step 405. Details are not described herein again.

906: Determine a display mode of the dynamic panel as a quasi-half-screen mode.

Specifically, for a process in which the processor 110 of the mobile phone 100 determines the display mode of the dynamic panel as the quasi-half-screen mode, refer to a related description in the foregoing step 406. Details are not described herein again.

In addition, it may be understood that, in some other embodiments, in the display method that is provided in this application and by which a display mode of a dynamic panel can be adjusted dynamically, the display mode of the dynamic panel may alternatively be determined based on only the amount of the to-be-displayed content of the dynamic panel. For example, only the foregoing steps 901, 902, 905, and 906 are performed. In other words, when the length of the to-be-displayed content exceeds the preset length threshold, the mobile phone 100 determines the display mode of the dynamic panel as the quasi-full-screen mode. When the length of the to-be-displayed content is less than or equal to (does not exceed) the preset length threshold, the mobile phone 100 determines the display mode of the dynamic panel as the quasi-half-screen mode. This is not limited herein.

Figure 10:
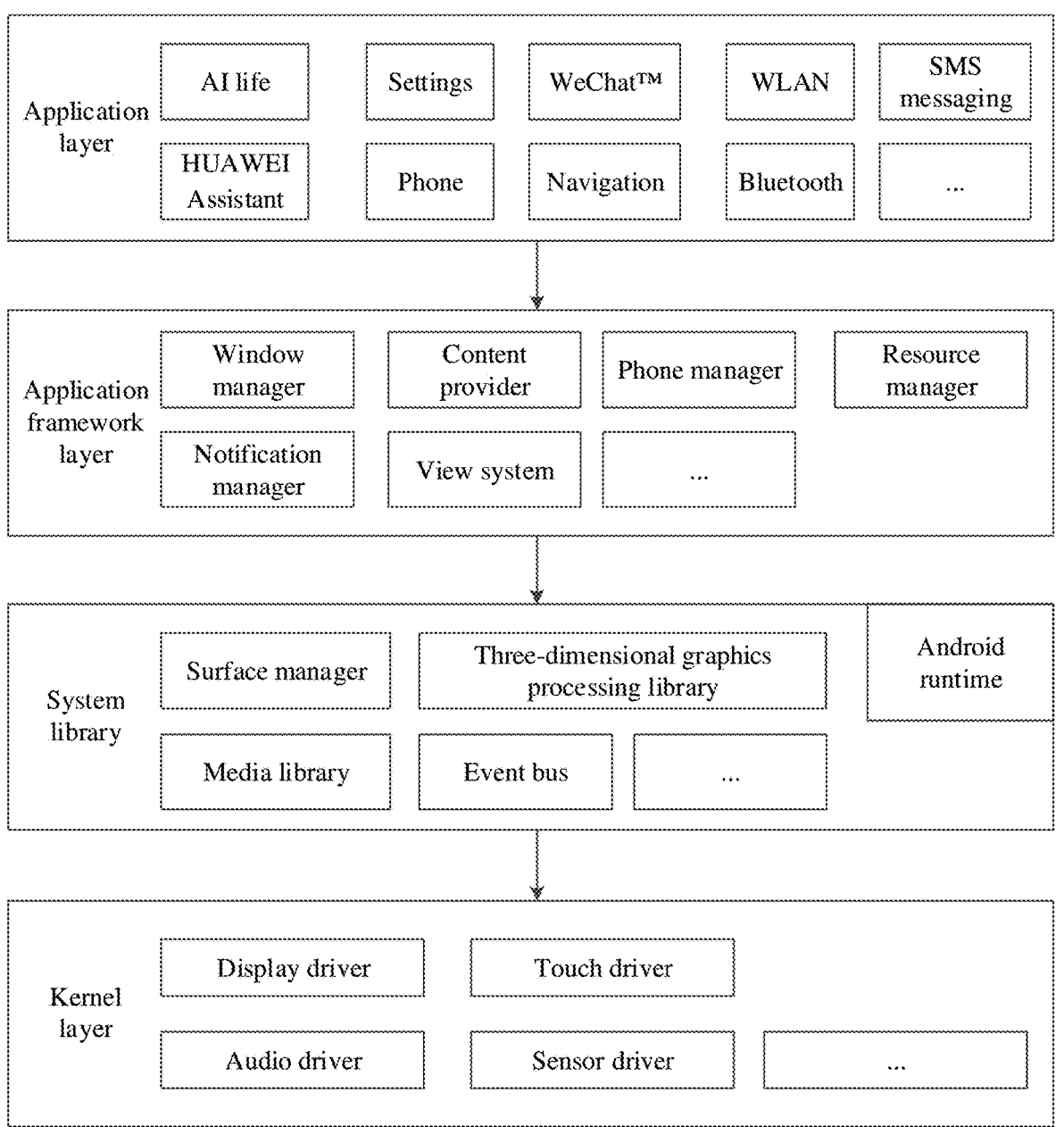
FIG. 10 is a schematic block diagram of a software structure of a mobile phone 100 according to an embodiment of this application.

FIG. 10 is a schematic block diagram of a software structure of the mobile phone 100 according to an embodiment of this application.

A software system of the mobile phone 100 may use a layered architecture, an event-driven architecture, a micro-kernel architecture, a micro service architecture, or a cloud architecture. In this embodiment of the present invention, an Android system of a layered architecture is used as an example to illustrate a software structure of the mobile phone 100.

FIG. 10 is a block diagram of a software structure of the mobile phone 100 according to an embodiment of the present invention.

In a layered architecture, software is divided into several layers, and each layer has a clear role and responsibility. The layers communicate with each other through a software interface. In some embodiments, the Android system is divided into four layers: an application layer, an application framework layer, an Android runtime (Android runtime) and system library layer, and a kernel layer from top down.

The application layer may include a series of application packages.

As shown in FIG. 10, the application packages may include applications such as AI Life, HUAWEI Assistant, Settings, Phone, WeChat™, Navigation, WLAN, Bluetooth, and SMS messaging. In this embodiment of this application, the AI Life application or the HUAWEI Assistant application may respond to an operation of the user. Then, a dynamic panel is displayed on an original display interface of the mobile phone 100, and the application interacts in response to a slide operation performed by the user on the dynamic panel. For example, on the "Have a good sleep" scene interface 860 created on the AI Life application 811 shown in FIG. 8F, the AI Life application 811 on the mobile phone 100 may display, in response to an operation performed by the user of tapping the time control 861 on the "Have a good sleep" scene interface 860, the specified time setting panel 870 (dynamic panel) shown in FIG. 8G.

The application framework layer provides an application programming interface (application programming interface, API) and a programming framework for an application at the application layer. The application framework layer includes some predefined functions.

As shown in FIG. 10, the application framework layer may include a window manager, a content provider, a phone manager, a resource manager, a notification manager, a view system, and the like.

The window manager is configured to manage a window program. The window manager may obtain a size of the display, determine whether there is a status bar, lock a screen, take a screenshot, and the like.

The content provider is configured to: store and obtain data, and enable the data to be accessible to an application. The data may include a video, an image, audio, calls that are made and answered, browsing history and favorites, a phone book, and the like.

The phone manager is configured to provide a communication function of the mobile phone 100, for example, management of a call status (including answering, declining, or the like).

The resource manager provides, for an application, various resources such as a localized character string, an icon, a picture, a layout file, and a video file.

The notification manager enables an application to display notification information in a status bar, and may be configured to convey a notification-type message. The displayed information may automatically disappear after a short stay, without user interaction. For example, the notification manager is configured to notify a user that downloading is completed, provide a message notification, and the like. The notification manager may alternatively provide a notification that appears in a top status bar of the system in a form of a graph or a scroll bar text, for example, a notification of an application that is run on a background, or may provide a notification that appears on the screen in a form of a dialog window. For example, text information is displayed in the status bar, a prompt sound is given, the electronic device vibrates, or the indicator light blinks.

The view system includes visual controls such as a control for displaying text and a control for displaying a picture. The view system may be configured to construct an application. A display interface may include one or more views. For example, a display interface including an SMS notification icon may include a text display view and a picture display view.

In this embodiment of this application, the view system and the window manager may monitor a bus event and control display of a corresponding interface. For example, when a slide operation event is detected, the type of a slide operation is determined, for example, the type is determined as a left/right slide operation, an up/down slide operation, or the like. Then, information corresponding to different slide events is displayed correspondingly. When a dynamic panel is drawn upon detecting an operation event of opening the dynamic panel, different display modes of the dynamic panel may be determined based on the type of a control that needs to be displayed on the dynamic panel, whether there is a slide control having a slide conflict, the length of content, and the like.

The Android runtime includes a kernel library and a virtual machine. The Android runtime is responsible for scheduling and managing the Android system.

The kernel library includes two parts: one part is a function that needs to be called in the Java language, and the other part is a kernel library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and an event bus.

The surface manager is configured to manage a display subsystem, and provide fusion of 2D and 3D graphics layers for a plurality of applications.

The media library supports playback and recording in a plurality of common audio and video formats, a static image file, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, graphics layer processing, and the like.

A 2D graphics engine is a drawing engine for 2D drawing.

The event bus is configured to broadcast, in a system of the mobile phone 100, an event corresponding to a slide operation, a tap operation, or the like performed by the user on an interface, such as an original display interface or a dynamic panel, of the mobile phone 100, and execute a default processing flow.

The kernel layer is a layer between hardware and software. The kernel layer includes at least a display driver, a camera driver, an audio driver, and a sensor driver. In this embodiment of this application, the display driver and a touch driver may drive hardware structures, such as the screen and the touch sensor, of the mobile phone 100 to perform corresponding functions, and package and transfer hardware signals generated by the hardware structures such as the screen and the touch sensor.

The following illustrates working processes of software and hardware of the mobile phone 100 with reference to an intelligent screen identification scene.

When the touch sensor 180K receives a touch operation, a corresponding hardware interruption is sent to the kernel layer. The kernel layer processes the touch operation into an original input event (including information such as touch coordinates, and a time stamp of the touch operation). The original input event is stored at the kernel layer. The application framework layer obtains the original input event from the kernel layer, and identifies a control corresponding to the input event. For example, the touch operation is an operation of pressing and holding text or a picture with two fingers, and the operation of pressing and holding text or a picture with two fingers corresponds to enabling the intelligent screen identification function in the HUAWEI Assistant application. The HUAWEI Assistant application invokes an interface at the application framework layer, to enable the intelligent screen identification function and identifies content of text or a picture selected by a user.

The use of "one embodiment" or "an embodiment" in this specification means that particular features, structures, or characteristics described with reference to the embodiment are included in at least one example implementation solution or technology disclosed according to this application. The phrase "in one embodiment" appearing in various places in this specification does not necessarily all mean a same embodiment.

This application further relates to an apparatus configured to perform operations in this specification. The apparatus may be constructed dedicatedly for required purposes, or may include a general-purpose computer selectively activated or reconfigured by a computer program stored in a computer. Such a computer program may be stored in a computer-readable medium, such as but not limited to, any type of disk, including a floppy disk, an optical disc, a CD-ROM, a magneto-optical disc, a read-only memory (ROM), a random access memory (RAM), an EPROM, an EEPROM, a magnetic or optical card, an application-specific integrated circuit (ASIC), or any type of medium that is suitable for storing electronic instructions. In addition, each of them may be coupled to a computer system bus. In addition, the computer mentioned in this specification may include a single processor or may use an architecture involving a plurality if processors for increased computing power.

Processes and displays presented in this specification do not inherently relate to any specific computer or another apparatus. Various general-purpose systems may also be used together with programs taught in this specification, or it may be proved that constructing more dedicated apparatuses to perform one or more method steps is convenient. Structures for various such systems are discussed in the following description. In addition, any specific programming language capable of implementing the technologies and implementation solutions disclosed in this application may be used. Various programming languages may be used to implement the present disclosure, as discussed in this specification.

In addition, the language used in this specification has been primarily chosen for readability and instructional purposes and may not be chosen to depict or limit the disclosed subject matter. Therefore, this application is intended to describe but not to limit the scope of the concepts discussed in this specification.

What is claimed is:

1. A method, the method comprising:
displaying, by a device, a first interface;
receiving, by the device, a first display instruction from a user that instructs to display a second interface above the first interface; and
displaying the second interface above the first interface in response to the first display instruction,
wherein a display size of the second interface is determined based on display content of the second interface,
wherein a larger amount of the display content of the second interface corresponds to a larger display size of the second interface,
wherein the display size of the second interface is determined by:
in response to a length of the display content being greater than a first length threshold, determining to display the second interface by using a first partial region in a screen of the device; or
in response to the length of the display content being less than the first length threshold, determining to display the second interface by using a second partial region in the screen of the device, wherein the first partial region is greater than the second partial region.

2. The method according to claim 1, wherein the first display instruction comprises a gesture operation performed by the user on the first interface or a voice instruction from the user to the device.

3. The method according to claim 2, wherein the first partial region occupies 50% to 100% of the screen of the device, and
the second partial region occupies 25% to 75% of the screen of the device.

4. The method according to claim 1, wherein a bottom edge of the first partial region is connected to a bottom edge of the screen of the device, and
a height of the first partial region is greater than $\frac{1}{2}$ of a height of the screen of the device.

5. The method according to claim 1, wherein a bottom edge of the second partial region is connected to a bottom edge of the screen of the device, and
a height of the second partial region is between $\frac{1}{4}$ and $\frac{3}{4}$ of a height of the screen of the device.

6. The method according to claim 1, further comprising:
receiving, by the device and during displaying of the first interface, a second display instruction from the user; and
displaying a third interface above the first interface in response to the second display instruction, wherein a display size of the third interface is determined based on display content of the third interface,
wherein the display size of the third interface is determined based on:
the display content of the third interface,
a determination that a slide control having a slide conflict exists in the third interface, and
a size of a slide hot spot of the slide control.

7. The method according to claim 6, wherein the display size of the third interface is determined by:
in response to determining that the slide control having the slide conflict exists in the third interface, a width of the slide hot spot of the slide control is greater than a preset width threshold, and a length of the display content of the third interface is greater than a second length threshold:
determining to display the third interface by using a third partial region in the screen of the device, wherein
the third partial region occupies 50% to 100% of the screen of the device.

8. The method according to claim 7, wherein the display size of the third interface is determined by:
in response to determining that the slide control having the slide conflict does not exist in the third interface, the width of the slide hot spot of the slide control is less than the preset width threshold, and the length of the display content of the third interface is less than the second length threshold; and
determining to display the third interface by using a fourth partial region in the screen of the device, wherein the fourth partial region occupies 25% to 75% of the screen of the device.

9. The method according to claim 8, wherein a bottom edge of the third partial region is connected to a bottom edge of the screen of the device, and
a height of the third partial region is greater than $\frac{1}{2}$ of a height of the screen of the device.

10. The method according to claim 8, wherein a bottom edge of the fourth partial region is connected to a bottom edge of the screen of the device, and a height of the fourth partial region is between ¼ and ¾ of a height of the screen of the device.

11. The method according to claim 6, wherein the third interface comprises a dynamic panel.

12. The method according to claim 1, wherein the first interface comprises a display interface of a first application, and the second interface is a display interface of a second application, or wherein the first interface and the second interface are different display interfaces that correspond to different functions of the first application.

13. A device, comprising:

one or more processors; and at least one non-transitory computer readable memory connected to the one or more processors and including computer program code, wherein the at least one non-transitory computer readable memory and the computer program code are configured, with the one or more processors, to cause the device to at least:

display a first interface;

receive a first display instruction from a user that instructs to display a second interface above the first interface; and display the second interface above the first interface in response to the first display instruction, wherein a display size of the second interface is determined based on display content of the second interface;

wherein a larger amount of the display content of the second interface corresponds to a larger display size of the second interface, wherein the display size of the second interface is determined by:

in response to a length of the display content being greater than a first length threshold, the device is configured to determine to display the second interface by using a first partial region in a screen of the device; or in response to the length of the display content being less than the first length threshold, determine to display the second interface by using a second partial region in the screen of the device, wherein the first partial region is greater than the second partial region.

14. The device according to claim 13, wherein the first display instruction comprises a gesture operation performed by the user on the first interface or a voice instruction from the user to the device.

15. The device according to claim 14, wherein the first partial region occupies 50% to 100% of the screen of the device, and the second partial region occupies 25% to 75% of the screen of the device.

16. The device according to claim 13, wherein a bottom edge of the first partial region is connected to a bottom edge of the screen of the device, and a height of the first partial region is greater than ½ of a height of the screen of the device.

17. The device according to claim 13, wherein a bottom edge of the second partial region is connected to a bottom edge of the screen of the device, and a height of the second partial region is between ¼ and ¾ of a height of the screen of the device.

18. The device according to claim 13, wherein the first interface comprises a display interface of a first application, and the second interface is a display interface of a second application, or wherein the first interface and the second interface are different display interfaces that correspond to different functions of the first application.

19. The device according to claim 13, wherein the second interface comprises a dynamic panel.

20. A device, comprising:

one or more processors; and at least one non-transitory computer readable memory connected to the one or more processors and including computer program code, wherein the at least one non-transitory computer readable memory and the computer program code are configured, with the one or more processors, to cause the device to at least:

display a first interface;

receive a first display instruction from a user that instructs to display a second interface above the first interface; and display the second interface above the first interface in response to the first display instruction, wherein a display size of the second interface is determined based on display content of the second interface, a determination of a slide control having a slide conflict exists in the second interface, and a size of a slide hot spot of the slide control, wherein the display size of the second interface is determined:

in response to determining that the slide control having the slide conflict exists in the second interface, a width of the slide hot spot of the slide control is greater than a preset width threshold, and a length of the display content is greater than a second length threshold, the device is caused to determine to display the second interface by using a third partial region in a screen of the device, wherein the third partial region occupies 50% to 100% of the screen of the device, in response to determining that the slide control having the slide conflict does not exist in the second interface, the width of the slide hot spot of the slide control is less than the preset width threshold, and the length of the display content is less than the second length threshold, the device is caused to determine to display the second interface by using a fourth partial region in the screen of the device, wherein the fourth partial region occupies 25% to 75% of the screen of the device.

* * * * *